United States Patent
Wu

(10) Patent No.: US 10,361,842 B2
(45) Date of Patent: Jul. 23, 2019

(54) ENCRYPTION FUNCTION AND DECRYPTION FUNCTION GENERATING METHOD, ENCRYPTION AND DECRYPTION METHOD AND RELATED APPARATUSES

(71) Applicant: HUAWEI INTERNATIONAL PTE. LTD., Singapore (SG)

(72) Inventor: Shuang Wu, Singapore (SG)

(73) Assignee: Huawei International Pte. Ltd., Singapore (SG)

( * ) Notice: Subject to any disclaimer, the term of this patent is extended or adjusted under 35 U.S.C. 154(b) by 295 days.

(21) Appl. No.: 15/462,221

(22) Filed: Mar. 17, 2017

(65) Prior Publication Data

US 2017/0195117 A1 Jul. 6, 2017

Related U.S. Application Data

(63) Continuation of application No. PCT/SG2015/050324, filed on Sep. 16, 2015.

(30) Foreign Application Priority Data

Sep. 18, 2014 (SG) ............................ 10201405852Q

(51) Int. Cl.
*H04L 9/06* (2006.01)
*G09C 1/00* (2006.01)
(Continued)

(52) U.S. Cl.
CPC .............. *H04L 9/0631* (2013.01); *G09C 1/00* (2013.01); *H04L 9/0618* (2013.01);
(Continued)

(58) Field of Classification Search
CPC ... H04L 9/0631; H04L 9/0618; H04L 9/0861; H04L 9/14; H04L 2209/046; H04L 2209/16; G09C 1/00
See application file for complete search history.

(56) References Cited

U.S. PATENT DOCUMENTS 8,161,463 B2   4/2012   Johnson et al.
8,370,642 B2   2/2013   Nobukata
(Continued)

FOREIGN PATENT DOCUMENTS

CN   101371480 A   2/2009
CN   101491000 A   7/2009
(Continued)

OTHER PUBLICATIONS

Chow et al., "White-Box Cryptography and an AES Implementation," Post Proceedings of the $9^{th}$ Annual shop on Selected Areas in Cryptography (Aug. 15-16, 2002).

(Continued)

*Primary Examiner* — Ayoub Alata
(74) *Attorney, Agent, or Firm* — Leydig, Voit & Mayer, Ltd.

(57) ABSTRACT

An encryption/decryption function generating method, an encryption/decryption method and related apparatuses, which can ensure the confidentiality of a key used in a white-box encryption and decryption function when a white-box encryption and decryption function generating algorithm is disclosed. The method includes: receiving a random seed and an original key that are input by a user; generating, according to the original key, a round key required for R-round iterative computing; generating, according to the random seed, an affine expansion mask required for the R-round iterative computing and random disturbance data required for the R-round iterative computing; and generating an encryption/decryption function.

16 Claims, 13 Drawing Sheets

(51) Int. Cl.
*H04L 9/08* (2006.01)
*H04L 9/14* (2006.01)

(52) U.S. Cl.
CPC ............ *H04L 9/0861* (2013.01); *H04L 9/14* (2013.01); *H04L 2209/046* (2013.01); *H04L 2209/16* (2013.01)

(56) References Cited

U.S. PATENT DOCUMENTS

| | | | |
|---|---|---|---|
| 8,422,668 B1* | 4/2013 | Thichina | H04L 9/003 380/28 |
| 8,504,845 B2* | 8/2013 | Farrugia | G06F 21/602 380/28 |
| 8,510,726 B2 | 8/2013 | Eisen et al. | |
| 2008/0019503 A1 | 1/2008 | Dupaquis et al. | |
| 2009/0313480 A1 | 12/2009 | Michiels et al. | |
| 2010/0080395 A1* | 4/2010 | Michiels | H04L 9/002 380/278 |
| 2010/0296649 A1* | 11/2010 | Katzenbeisser | G06F 21/10 380/28 |
| 2011/0120125 A1 | 5/2011 | Castan et al. | |
| 2012/0002807 A1 | 1/2012 | Michiels et al. | |
| 2012/0020476 A1 | 1/2012 | Billet et al. | |
| 2012/0045050 A1 | 2/2012 | Farrugia et al. | |
| 2012/0170740 A1* | 7/2012 | Lee | H04L 9/0618 380/44 |
| 2012/0300922 A1* | 11/2012 | Billet | H04L 9/0618 380/28 |
| 2015/0293911 A1* | 10/2015 | Tolhuizen | G09C 1/00 707/827 |
| 2017/0235552 A1* | 8/2017 | Tolhuizen | H04L 9/002 713/165 |

FOREIGN PATENT DOCUMENTS

| | | |
|---|---|---|
| CN | 101536398 A | 9/2009 |
| CN | 102047220 A | 5/2011 |
| EP | 2458774 A1 | 5/2012 |
| WO | WO 2010146139 A1 | 12/2010 |
| WO | WO 2011120125 A1 | 10/2011 |
| WO | WO 2014095772 A1 | 6/2014 |

OTHER PUBLICATIONS

Xiao et al., "A Secure Implementation of White-Box AES," IEEE Computer Science and its Applications, Institute of Electrical and Electronic Engineers, New York, New York (2009).
Willich, "A Technique with an Information-Theoretic Basis for Protecting Secret Data from Differential Power Attacks," Lecture Notes in Computer Science, Crytography and Coding 2001, (2001).
Billet et al., "Cryptanalysis of a White Box AES Implementation," Lecture Notes in Computer Science, Selected Areas in Cryptography, pp. 227-240 (2005).

* cited by examiner

| p0 | p4 | p8 | p12 |
| p1 | p5 | p9 | p13 |
| p2 | p6 | p10 | p14 |
| p3 | p7 | p11 | p15 | though several sub-tables, the sub-tables are computed separately and the computing results are XORed as the output of the original table, where the mask layer has to be affine transformation.
ENCRYPTION FUNCTION AND DECRYPTION FUNCTION GENERATING METHOD, ENCRYPTION AND DECRYPTION METHOD AND RELATED APPARATUSES

CROSS-REFERENCE TO RELATED APPLICATIONS

This application is a continuation of International Application No. PCT/SG2015/050324, filed on Sep. 16, 2015, which claims priority to Singapore Patent Application No. 10201405852Q, filed on Sep. 18, 2014. The disclosures of the aforementioned applications are hereby incorporated by reference in their entireties.

TECHNICAL FIELD

The present invention relates to the field of information technologies, and in particular, to an encryption function and decryption function generating method, an encryption and decryption method and related apparatuses.

BACKGROUND

A white-box model is a typical model in existing cipher attack models. In a white-box model, it may be considered that an attacker has accessed a system of a computing module used for encryption and decryption computing, and has taken full control of the system. That is, the computing module F( ) is completely transparent to the attacker, and the attacker can view or modify values of all data anytime, and can also view and modify an intermediate result of any computing step.

Because having full control over the system, the white-box attacker can view all data in a memory. In a conventional cryptographic algorithm, a key is directly stored in a memory during a computing process. The attacker can find the key at a high probability by only locating data that is comparatively random in the memory. Therefore, the conventional cryptographic algorithm is very vulnerable to the white-box attacker. To prevent the attacker from stealing the key in the white-box model, Chow and others put forward a concept of white-box cryptography in 2002 and designed a white-box implementation method for the advanced encryption standard (Advanced Encryption Standard, AES) and the data encryption standard (Data Encryption Standard, DES). A white-box cryptographic algorithm C generally includes two parts: one part is a white-box encryption and decryption function generating algorithm G, and the other part is a white-box encryption function E' and a white-box decryption function D' that are generated. As shown in FIG. 1, the white-box encryption and decryption function generating algorithm G receives two inputs: an original key K and a random seed, and a white-box encryption function E' and a white-box decryption function D' are generated. The white-box cryptographic algorithm C=E'(P) encrypts a plaintext P into a ciphertext C, and the white-box cryptographic algorithm P=D'(C) decrypts the ciphertext C into the plaintext P. In a data segment of E' and D' and during a computing process, the original key K itself is completely hidden, and therefore the key can be protected from being stolen by a hacker.

Currently, design ideas for the white-box encryption and decryption function generating algorithms are similar, and a general practice has the following two points:

First, computing is changed to table lookup, and random affine masks layers are added to the input and output of the tables. The output masks will be inverted by the input masks in the next round. As a result, the final output value remains the unchanged. Second, taking the size of the lookup tables into account, if the original table needs to be split into several sub-tables, the sub-tables are computed separately and the computing results are XORed as the output of the original table, where the mask layer has to be affine transformation.

However, currently, the design of the white-box encryption and decryption function generating algorithm is imperfect, because the encryption and decryption function in a white-box AES can generally be split into several 8 bit-to-8 bit pre-computation tables T. The tables T may be considered as adding an unknown affine mask layer $F_0^{-1}$ and an unknown affine mask layer $F_1$ before and after an S-box respectively in the AES, where the input mask layer $F_0^{-1}$ includes 1-byte information of the key. Currently, there is an algorithm, which can recover the input and output mask layers if S and T are known. After the mask layers of T-boxes in two consecutive connected rounds are recovered, the attacker can obtain 1-byte information of the key. Subsequently, by repeating the foregoing process, the whole key can be recovered. Consequently, all disclosed white-box encryption and decryption function generating algorithms can be practically cracked with low attack complexity.

SUMMARY

Embodiments of the present invention provide an encryption and decryption function generating method, an encryption and decryption method and related apparatuses, which can ensure the confidentiality of a key used in a white-box encryption and decryption function when a white-box encryption and decryption function generating algorithm is disclosed, and increase the attack complexity of recovering the key by an attacker.

The following technical solutions are adopted in the embodiments of the present invention:

According to a first aspect, an encryption/decryption function generating method is provided, where the method includes:

receiving a random seed and an original key that are input by a user;

generating, according to the original key, a round key required for R-round iterative computing, where the round key required for the R-round iterative computing includes a round key of an $r^{th}$ round, R represents the number of rounds of iterative computing required for generating an encryption/decryption function, R is a positive integer, and $1 \leq r \leq R$;

generating, by using a random number generator and according to the random seed, an affine expansion mask required for the R-round iterative computing and random disturbance data required for the R-round iterative computing, where the affine expansion mask is used to transform m-bit data into n-bit data, m and n are preset positive integers, n>m, the affine expansion mask required for the R-round iterative computing includes an affine expansion mask of the $r^{th}$ round, and the random disturbance data required for the R-round iterative computing includes random disturbance data of the $r^{th}$ round; and generating the encryption/decryption function, where the encryption/decryption function includes a pre-computation table for the R-round iterative computing, a pre-computation table of the $r^{th}$ round in the pre-computation table for the R-round iterative computing includes a one-to-one mapping relationship between preset input data of the $r^{th}$ round and output data corresponding to the input data, the preset input data of the $r^{th}$ round includes preset input mask data of the $r^{th}$ round, the output data includes output mask data of the $r^{th}$ round and the random disturbance data of the $r^{th}$ round, and the output mask data of the $r^{th}$ round is calculated according to a preset initial value, the round key of the $r^{th}$ round, and the affine expansion mask of the $r^{th}$ round.

In a first possible implementation manner of the first aspect, with reference to the first aspect, the affine expansion mask is determined according to $F(x)=A*x+b$, where x is an m-dimensional column vector, A and b are matrixes generated by using the random number generator and according to the random seed, A is an (n*m)-sized full-column-rank matrix on binary field, b is an n-dimensional column vector, and $F(x)$ can be determined according to A and b.

In a second possible implementation manner of the first aspect, with reference to the first aspect or the first possible implementation manner of the first aspect, the affine expansion mask of the $r^{th}$ round includes an input affine expansion mask of the $r^{th}$ round and an output affine expansion mask of the $r^{th}$ round.

In a third possible implementation manner of the first aspect, with reference to the first aspect to the second possible implementation manner of the first aspect, m is preset to an input/output length of an S-box whose input length is the same as its output length;

that the output mask data of the $r^{th}$ round is calculated according to a preset initial value, the round key of the $r^{th}$ round, and the affine expansion mask of the $r^{th}$ round includes:

the output mask data of the $r^{th}$ round is calculated with reference to the S-box according to the preset initial value, the round key of the $r^{th}$ round, and the affine expansion mask of the $r^{th}$ round.

According to a second aspect, an encryption method is provided, where the method includes:

receiving a plaintext input by a user;

calculating input mask data according to an input affine expansion mask included in a pre-stored affine expansion mask and the plaintext, where the affine expansion mask is used to affinely transform m-bit data into n-bit data, where m and n are preset positive integers, and n>m;

obtaining output mask data according to the input mask data using a pre-stored encryption function, where the pre-stored encryption function includes a pre-computation table of R-round iterative computing, a pre-computation table of an $r^{th}$ round in the pre-computation table for the R-round iterative computing includes a one-to-one mapping relationship between preset input data of the $r^{th}$ round and output data corresponding to the input data, the preset input data of the $r^{th}$ round includes preset input mask data of the $r^{th}$ round, the output data includes output mask data of the $r^{th}$ round and random disturbance data of the $r^{th}$ round, and the output mask data of the $r^{th}$ round is calculated according to a preset initial value, a round key of the $r^{th}$ round, and an affine expansion mask of the $r^{th}$ round, the affine expansion mask of the $r^{th}$ round and the random disturbance data of the $r^{th}$ round are generated by an encryption function generating apparatus according to a received random seed and by using a random number generator, 1≤r≤R, R represents the number of rounds of iterative computing required for generating the encryption function; and calculating ciphertext corresponding to the plaintext according to an output affine expansion mask included in the pre-stored affine expansion mask and the output mask data.

According to a third aspect, a decryption method is provided, where the method includes:

receiving a ciphertext input by a user;

calculating input mask data according to an input affine expansion mask included in a pre-stored affine expansion mask and the ciphertext, where the affine expansion mask is used to affinely transform m-bit data into n-bit data, where m and n are preset positive integers, and n>m;

obtaining output mask data according to the input mask data using a pre-stored decryption function, where the pre-stored decryption function includes a pre-computation table of R-round iterative computing, a pre-computation table of an $r^{th}$ round in the pre-computation table for the R-round iterative computing includes a one-to-one mapping relationship between preset input data of the $r^{th}$ round and output data corresponding to the input data, the preset input data of the $r^{th}$ round includes preset input mask data of the $r^{th}$ round, the output data includes output mask data of the $r^{th}$ round and random disturbance data of the $r^{th}$ round, and the output mask data of the $r^{th}$ round is calculated according to a preset initial value, a round key of the $r^{th}$ round, and an affine expansion mask of the $r^{th}$ round, the affine expansion mask of the $r^{th}$ round and the random disturbance data of the $r^{th}$ round are generated by a decryption function generating apparatus according to a received random seed and by using a random number generator, 1≤r≤R, and R represents the number of rounds of iterative computing required for generating the decryption function; and calculating plaintext corresponding to the ciphertext according to an output affine expansion mask included in the pre-stored affine expansion mask and the output mask data.

According to a fourth aspect, an encryption/decryption function generating apparatus is provided, where the apparatus includes hardware and or software components to perform the steps according to the first aspect.

According to a fifth aspect, an encryption apparatus is provided, where the encryption apparatus includes hardware and/or software components to perform the steps according to the second aspect.

According to an sixth aspect, a decryption apparatus is provided, where the decryption apparatus includes hardware and/or software components to perform the steps according to the third aspect.

Embodiments of the present invention provide an encryption function and decryption function generating method, an encryption and decryption method and related apparatuses. The encryption function generating method includes: receiving a random seed and an original key that are input by a user; generating, according to the original key, a round key required for R-round iterative computing, where the round key required for the R-round iterative computing includes a round key of an $r^{th}$ round, R represents the number of rounds of iterative computing required for generating an encryption function, R is a positive integer, and 1≤r≤R; generating, by using a random number generator and according to the random seed, an affine expansion mask required for the R-round iterative computing and random disturbance data required for the R-round iterative computing, where the affine expansion mask is used to affinely transform m-bit data into n-bit data, m and n are preset positive integers, n>m, the affine expansion mask required for the R-round iterative computing includes an affine expansion mask of the $r^{th}$ round, and the random disturbance data required for the R-round iterative computing includes random disturbance data of the $r^{th}$ round; and generating the encryption function, where the encryption function includes a pre-computation table for the R-round iterative computing, a pre-computation table of the $r^{th}$ round in the pre-computation table for the R-round iterative computing includes a one-to-one mapping relationship between preset input data of the $r^{th}$ round and output data corresponding to the input data, the preset input data of the $r^{th}$ round includes preset input mask data of the $r^{th}$ round, the output data includes output mask data of the $r^{th}$ round and the random disturbance data of the $r^{th}$ round, and the output mask data of the $r^{th}$ round is calculated according to a preset initial value, the round key of the $r^{th}$ round, and the affine expansion mask of the $r^{th}$ round.

The decryption function generating method includes: receiving a random seed and an original key that are input by a user; generating, according to the original key, a round key required for R-round iterative computing, where the round key required for the R-round iterative computing includes a round key of an $r^{th}$ round, R represents the number of rounds of iterative computing required for generating a decryption function, R is a positive integer, and $1 \leq r \leq R$; generating, by using a random number generator and according to the random seed, an affine expansion mask required for the R-round iterative computing and random disturbance data required for the R-round iterative computing, where the affine expansion mask is used to affinely transform m-bit data into n-bit data, m and n are preset positive integers, n>m, the affine expansion mask required for the R-round iterative computing includes an affine expansion mask of the $r^{th}$ round, and the random disturbance data required for the R-round iterative computing includes random disturbance data of the $r^{th}$ round; and generating the decryption function, where the decryption function includes a pre-computation table for the R-round iterative computing, a pre-computation table of the $r^{th}$ round in the pre-computation table for the R-round iterative computing includes a one-to-one mapping relationship between preset input data of the $r^{th}$ round and output data corresponding to the input data, the preset input data of the $r^{th}$ round includes preset input mask data of the $r^{th}$ round, the output data includes output mask data of the $r^{th}$ round and the random disturbance data of the $r^{th}$ round, and the output mask data of the $r^{th}$ round is calculated according to a preset initial value, the round key of the $r^{th}$ round, and the affine expansion mask of the $r^{th}$ round.

Because plenty of random disturbance data is added in a pre-computation table corresponding to an encryption function and a decryption function, an attacker cannot use the prior art to recover key bytes included in the pre-computation table at computational complexity of $2^{25}$ until the attacker finds a real pre-computation table. Therefore, the attacker has to attempt all possible affine subsets. That is, the attacker needs to exhaustively try all of N(n,m) different m-dimensional affine subsets and then attempt to recover a key, where the computational complexity is $$N(n, m) + 2^{25} \cdot \max\left\{1, \frac{N(n, m)}{2^{4n}}\right\},$$

which significantly increases complexity of attacking and ensure the confidentiality of the key used in a white-box encryption function or decryption function if a white-box encryption function or decryption function generating method is disclosed.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 2-1 is a schematic diagram of an AK operation in an AES-128 encryption process according to an embodiment of the present invention;

FIG. 2-2 is a schematic diagram of an SB operation in an AES-128 encryption process according to an embodiment of the present invention;

FIG. 2-3 is a schematic diagram of an SR operation in an AES-128 encryption process according to an embodiment of the present invention;

FIG. 2-4 is a schematic diagram of an MC operation in an AES-128 encryption process according to an embodiment of the present invention;

FIG. 3 is a schematic diagram of generating a pre-computation table in a case of unsplit column computing according to an embodiment of the present invention;

FIG. 4 is a schematic diagram of splitting column computing and generating a pre-computation table according to an embodiment of the present invention;

DESCRIPTION OF EMBODIMENTS

Figure 1:
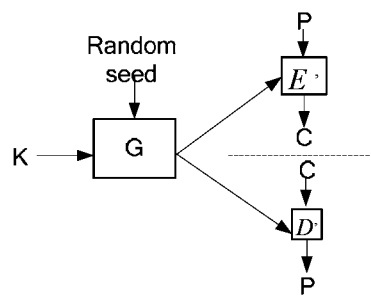
FIG. 1 is a schematic diagram of white-box encryption according to an embodiment of the present invention.

First, to make description of each embodiment clear and concise, several concepts are described briefly below:

Binary field ($GF_2$): defines a binary set {0,1} of addition and multiplication, where the addition is equivalent to bitwise XOR, and the multiplication is equivalent to bitwise AND. Operation rules on the binary field $GF_2$ are shown in Table 1 and Table 2:

TABLE 1

| Addition | 0 | 1 |
|---|---|---|
| 0 | 0 | 1 |
| 1 | 1 | 0 |

TABLE 2

| Multiplication | 0 | 1 |
|---|---|---|
| 0 | 0 | 0 |
| 1 | 0 | 1 |

Affine transformation: affine transformation is equivalent to a linear transformation plus a translation, and may be expressed as $F(x)=A*x+b$ by using a matrix operation, where x is an m-dimensional column vector, A is an n*m matrix, b is an n-dimensional column vector, and an output value is an n-dimensional column vector. In a case of a bit length expansion, n>m. Exemplarily, an affine transformation for mapping a 3-dimensional column vector to a 4-dimensional column vector may be expressed as:

$$\begin{pmatrix} y_0 \\ y_1 \\ y_2 \\ y_3 \end{pmatrix} = \begin{pmatrix} a_{0,0} & a_{0,1} & a_{0,2} \\ a_{1,0} & a_{1,1} & a_{1,2} \\ a_{2,0} & a_{2,1} & a_{2,2} \\ a_{3,0} & a_{3,1} & a_{3,2} \end{pmatrix} \cdot \begin{pmatrix} x_0 \\ x_1 \\ x_2 \end{pmatrix} + \begin{pmatrix} b_0 \\ b_1 \\ b_2 \\ b_3 \end{pmatrix}$$

It should be noted that both the linear transformation $L(x)=A*x$ and the affine transformation $F(x)=A*x+b$ satisfy a linear relationship $L(x)+L(y)=L(x+y)=A*(x+y)$. The affine transformation in this patent includes linear transformation by default (that is, a special affine transformation when a translation amount b=0). In addition, the affine transformation mentioned in this patent is all defined in multi-dimensional binary field space.

Affine subset: an affine subset refers to an m-dimensional subset formed by mapping a universal set of m-dimensional binary field space into target n-dimensional space by means of an affine transformation $F(x)=Ax+b$ from m-dimensional binary field space to n-dimensional binary field space, which is defined as follows:

$$Y=\{y=A\cdot x+b|x\in(GF_2)^m\}$$

White-box cryptography: generally refers to a special implementation method in a standard symmetric cryptographic algorithm, and is functionally equivalent to an encryption or decryption function that uses a specific key. The generated encryption and decryption function integrates the used key into a computing process instead of directly displaying the key. An attacker cannot directly see the key even if the attacker checks any intermediate value in a white-box encryption or decryption computing process. Therefore, the white-box cryptography may be used to protect the key used in the cryptographic algorithm.

S-box: a basic module and computing unit that is often used in a cryptographic algorithm, which is generally a fixed function of a fixed-length input and a fixed-length output. For example, the S-box used in the AES is a fixed function of an 8-bit input and an 8-bit output; and the S-box used in the DES is a fixed function of a 6-bit input and a 4-bit output.

DES: international block cipher standard Federal Information Processing Standards (Federal Information Processing Standards, FIPS) publication (Publication, PUB) 46-2, where a block length is 64 bits and a key is 64 bits (only 56 bits are significant), which has been cracked currently.

AES: international block cipher standard FIPS PUB 127, which supports keys of three lengths: 128 bits, 122 bits and 256 bits, where all the plaintext and ciphertext lengths of the three versions are 128 bits (16 bytes). The AES is expounded below by using AES-128 as an example: The AES-128 processes a 16-byte plaintext (4*4 byte matrix), and iterates by 10 rounds, where each round includes four operations:

(1) Adding round key (AddRoundKey, AK): XORing the round key to the current state.

(2) Substituting for bytes (SubBytes, SB): substituting the S-box for all current bytes.

(3) Shifting row (ShiftRow, SR): shifting an $i^{th}$ row leftward cyclically by i bytes, 0<=i<=3.

(4) Mixing column (MixColumn, MC): multiplying 4 bytes of each column by a matrix on a finite field $GF_{256}$, where, exemplarily the matrix may be as follows:

$$\begin{pmatrix} 02 & 03 & 01 & 01 \\ 01 & 02 & 03 & 01 \\ 01 & 01 & 02 & 03 \\ 03 & 01 & 01 & 02 \end{pmatrix}.$$

Figures 1, 2:
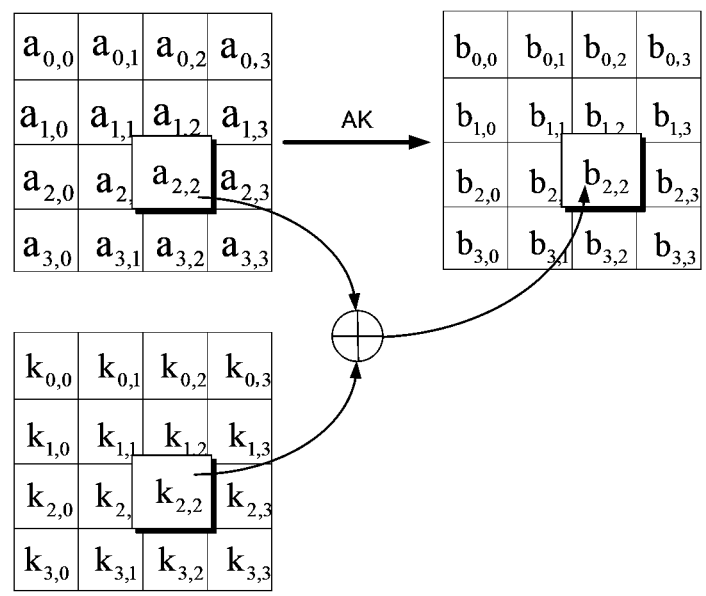
Figure 2:
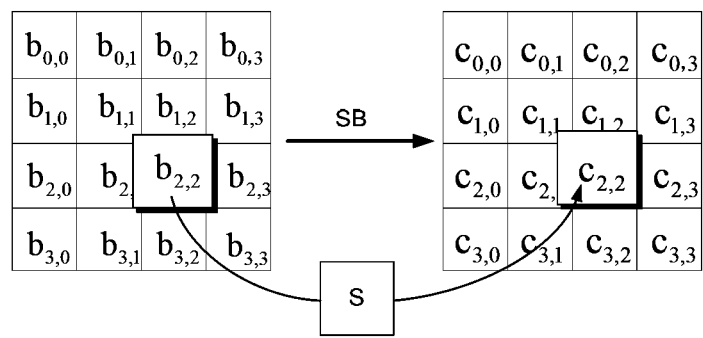
Figures 2, 3:
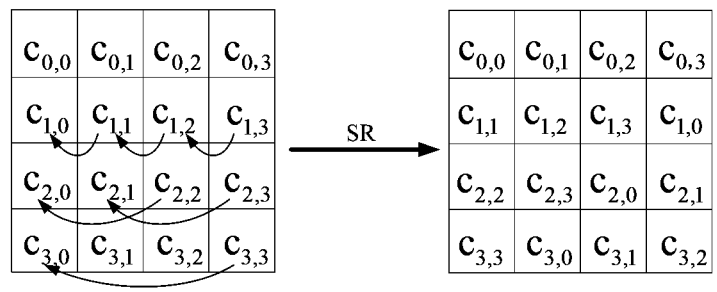
Figures 2, 3, 4:
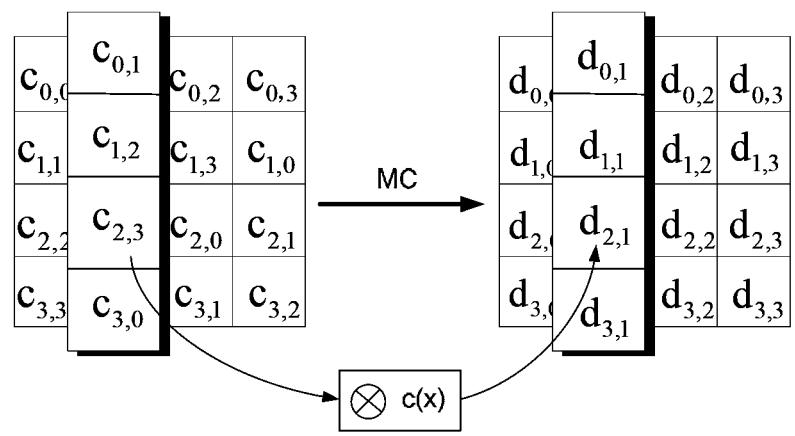
Figure 3:
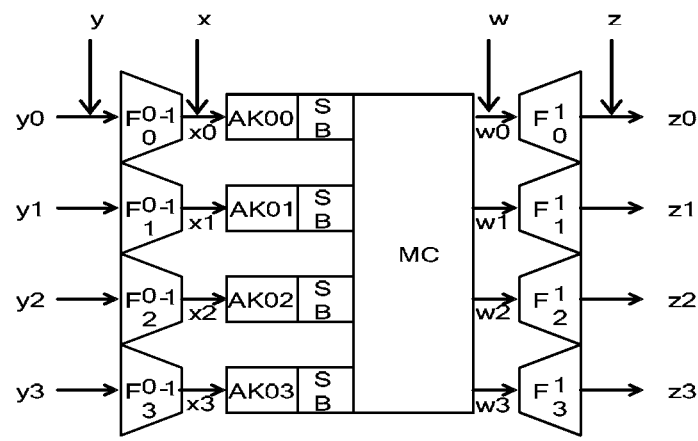
Figure 4:
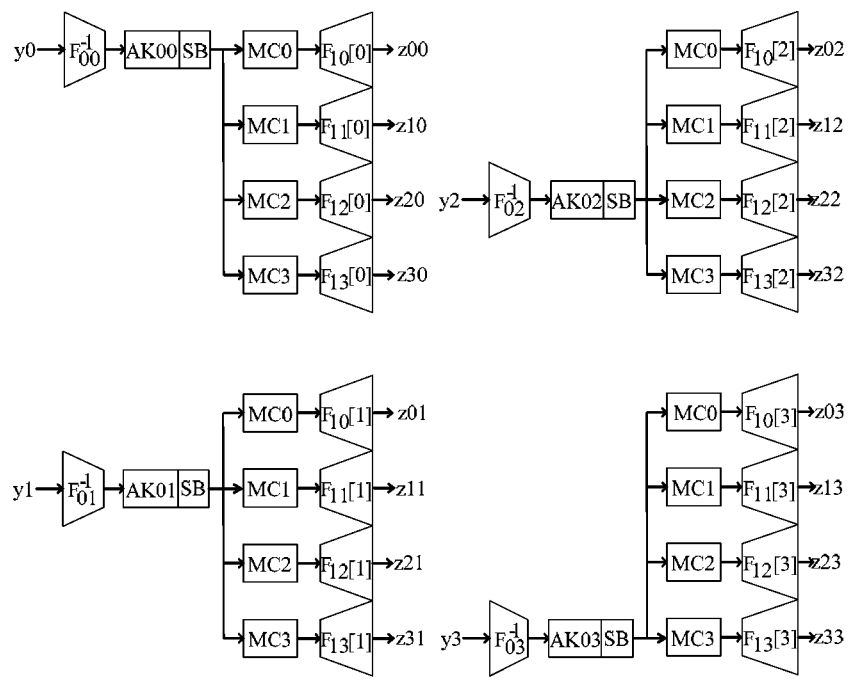

It is assumed that, in a process of four operations during a round of iterations, an input of an AK process is $$x = \begin{pmatrix} a_{0,0} & a_{0,1} & a_{0,2} & a_{0,3} \\ a_{1,0} & a_{1,1} & a_{1,2} & a_{1,3} \\ a_{2,0} & a_{2,1} & a_{2,2} & a_{2,3} \\ a_{3,0} & a_{3,1} & a_{3,2} & b_{3,3} \end{pmatrix}$$

and a key is $$k = \begin{pmatrix} k_{0,0} & k_{0,1} & k_{0,2} & k_{0,3} \\ k_{1,0} & k_{1,1} & k_{1,2} & k_{1,3} \\ k_{2,0} & k_{2,1} & k_{2,2} & k_{2,3} \\ k_{3,0} & k_{3,1} & k_{3,2} & k_{3,3} \end{pmatrix},$$

then an AK process shown in FIG. 2-1 may be performed to yield a first operation result $$x1 = \begin{pmatrix} b_{0,0} & b_{0,1} & b_{0,2} & b_{0,3} \\ b_{1,0} & b_{1,1} & b_{1,2} & b_{1,3} \\ b_{2,0} & b_{2,1} & b_{2,2} & b_{2,3} \\ b_{3,0} & b_{3,1} & b_{3,2} & b_{3,3} \end{pmatrix};$$

the first operation result is used as an input of an SB process, and the SB process shown in FIG. 2-2 may be performed to yield a second operation result $$x2 = \begin{pmatrix} c_{0,0} & c_{0,1} & c_{0,2} & c_{0,3} \\ c_{1,0} & c_{1,1} & c_{1,2} & c_{1,3} \\ c_{2,0} & c_{2,1} & c_{2,2} & c_{2,3} \\ c_{3,0} & c_{3,1} & c_{3,2} & c_{3,3} \end{pmatrix};$$

the second operation result is used as an input of the SR process, and the SR process shown in FIG. 2-3 may be performed to yield a third operation result $$x3 = \begin{pmatrix} c_{0,0} & c_{0,1} & c_{0,2} & c_{0,3} \\ c_{1,1} & c_{1,2} & c_{1,3} & c_{1,0} \\ c_{2,2} & c_{2,3} & c_{2,0} & c_{2,1} \\ c_{3,3} & c_{3,0} & c_{3,1} & c_{3,2} \end{pmatrix};$$

and, the third operation result is used as an input of an MC process, and a matrix on the finite field $GF_{256}$ is set to $C(x)$, then the MC process shown in FIG. 2-4 may be performed to yield a fourth operation result $$x4 = \begin{pmatrix} d_{0,0} & d_{0,1} & d_{0,2} & d_{0,3} \\ d_{1,1} & d_{1,2} & d_{1,3} & d_{1,0} \\ d_{2,2} & d_{2,3} & d_{2,0} & d_{2,1} \\ d_{3,3} & d_{3,0} & d_{3,1} & d_{3,2} \end{pmatrix}.$$

It should be noted that the last round of iteration includes no MC operation but includes one more AK, that is, AK→SB→SR→AK.

It should be noted that because both SB and SR operations are pertinent to a single byte, the order may be changed so that the AES encryption operations are: (AK SR SB MC) (AK SR SB MC) (AK SR SB MC) . . . (AK SR SB MC); further, because the AK is to XOR bytes of a key of each round onto each byte in an iteration state, the bytes of the key may be disarranged and then the AK is exchanged with the SR so that the AES is equivalently expressed as SR (AK' SB MC) SR (AK' SB MC) SR (AK' SB MC) . . . SR (AK' SB MC).

Similarly, the design of the AES is elaborate, and a decryption process may also be written in a similar equivalent form:

$SR^{-1}$ $(AK'$ $SB^{-1}$ $MC^{-1})$ $SR^{-1}$ $(AK'$ $SB^{-1}$ $MC^{-1})$ . . . $SR^{-1}$ $(AK'$ $SB^{-1}$ $MC^{-1})$, which is not detailed here any further.

The implementation manner of the AES is as follows:

As mentioned in the background, the encryption and decryption process of the AES may be implemented by means of table lookup, and (AK SB MC) may be computed column by column. However, with the table size taken into account, the computing process of one of the columns (4-byte input and 4-byte output) may be split into 4 attempts of table lookup. The process is as follows:

First, several symbols are arranged. During the computing process of the pre-computation table, each intermediate state value is denoted by a corresponding symbol:

y→$F_{r-1}^{-1}$→x→AK SB MCj→w→$F_r$→z, where $F_{r-1}^{-1}$ is an input affine mask of the $r^{th}$ round, and F is an output affine mask of the $r^{th}$ round.

Before the computing process is split, as shown in FIG. 3, it is assumed that, from the input column (y0,y1,y2,y3), an output value (z0,z1,z2,z3) of the first round of this column is calculated, then from FIG. 3 it can be seen that yi undergoes an affine transformation of the input affine mask $F_{0i}^{-1}$ to yield xi, and xi undergoes a transformation of an AK SB MC process to yield wi, and wi undergoes an affine transformation of the output affine mask $F_{1i}$ to yield an output result zi, where $0 \le i \le 3$. In this process, a major table needs to be formed from the entire operation, and occupies space of $4n*2^{4n}$ bits. In table lookup, zi may be obtained by using yi to look up in an $i^{th}$ pre-computation table.

After the foregoing computing process is split into 4 computing sub-processes shown in FIG. 4, FIG. 3 may be compared with FIG. 4 to show that MC is split into MC0, MC1, MC2, and MC3, $F_{1i}$ is split into $F_{1i}[0]$, $F_{1i}[1]$, $F_{1i}[2]$, and $F_{1i}[3]$, and zi is split into zi0, zi1, zi2, and zi3.

Because MC is a linear operation, and MC is equivalent to multiplying a specific row of output values of an S-box by different constants separately, and using products as elements of different rows of an output column vector. Exemplarily, using the first schematic sub-diagram shown in FIG. 4 as an example, it is assumed that the output value of the S-box is t0 and that a matrix on a finite field $GF_{256}$ required for the MC operation is $$\begin{pmatrix} 02 & 03 & 01 & 01 \\ 01 & 02 & 03 & 01 \\ 01 & 01 & 02 & 03 \\ 03 & 01 & 01 & 02 \end{pmatrix}, \text{ then}$$

$$MC(t) = \begin{pmatrix} 02 & 03 & 01 & 01 \\ 01 & 02 & 03 & 01 \\ 01 & 01 & 02 & 03 \\ 03 & 01 & 01 & 02 \end{pmatrix} * \begin{pmatrix} t0 \\ 0 \\ 0 \\ 0 \end{pmatrix} = \begin{pmatrix} 02*t0 \\ 01*t0 \\ 01*t0 \\ 03*t0 \end{pmatrix} = \begin{pmatrix} MC0(t0) \\ MC1(t0) \\ MC2(t0) \\ MC3(t0) \end{pmatrix}.$$

Therefore, the computing result of the figure may be subdivided into 4 pre-computation tables of a minimum unit. The input length and the output length of each pre-computation table are the same, and the data obtaining manner of the pre-computation table is as follows:

$y0 \to F_{00}^{-1} \to AK \to SB \to MC0 \to F_{10}[0] \to z00$ $y0 \to F_{00}^{-1} \to AK \to SB \to MC1 \to F_{11}[0] \to z10$ $y0 \to F_{00}^{-1} \to AK \to SB \to MC2 \to F_{12}[0] \to z20$ $y0 \to F_{00}^{-1} \to AK \to SB \to MC3 \to F_{13}[0] \to z30$

Figure 5:
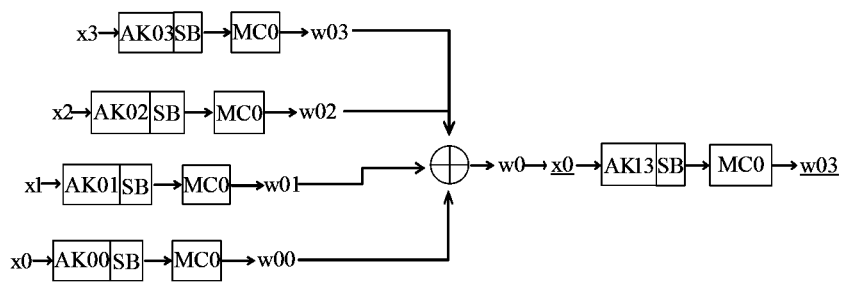
FIG. 5 is a schematic diagram of a relationship between two consecutive rounds of iterative input and output data after splitting of column computing according to an embodiment of the present invention.

After the operation of this column is split, each operation may be used to form 4 sub-tables with a size of $n*2^n$ bits, which occupy only $4n*2^n$ bits, and therefore, the storage space is saved significantly. In table lookup, by using yi to look up in a $j^{th}$ pre-computation table, $zij (0 \le j \le 3)$ may be obtained. The following describes reasonableness of the foregoing splitting process, using i=0 as an example:

Without adding an input or output affine mask, a person skilled in the art can easily prove that real data w0 of a next round (a $2^{nd}$ round) is obtained by XORing $w0j (0 \le j \le 3)$ in the same row of the current round (the $1^{st}$ round), that is, w0=w00+w01+w02+w03, and an output w0 of the current round (the $1^{st}$ round) is used as an input $\underline{x0}$ of the next round to proceed with the table lookup of the next round (the $2^{nd}$ round). The process is shown in FIG. 5.

After the input and output affine masks are added, it is assumed that i=0, the input affine mask of the $1^{st}$ round is $F_{00}^{-1}$, the output mask $F_{10}(x)=A*x+b$ of the $1^{st}$ round is split into 4 equations: $F_{10}[j](x)=A*x+b[j]$ (0≤j≤3), where b=b[0]+b[1]+b[2]+b[3]. Because $z0j=F_{10}[j](w0j)$, $$\begin{aligned} z0 &= z00 + z01 + z02 + z03 \\ &= F_{10}[0](w00) + F_{10}[1](w01) + F_{10}[2](w02) + F_{10}[3](w03) \\ &= (A*w00 + b[0]) + (A*w01 + b[1]) + (A*w02 + b[2]) + (A*w03 + b[3]) \\ &= A*(w00 + w01 + w02 + w03) + (b[0] + b[1] + b[2] + b[3]) \\ &= A(w0) + b \\ &= F_{10}(w0) \end{aligned}$$

Figure 6:
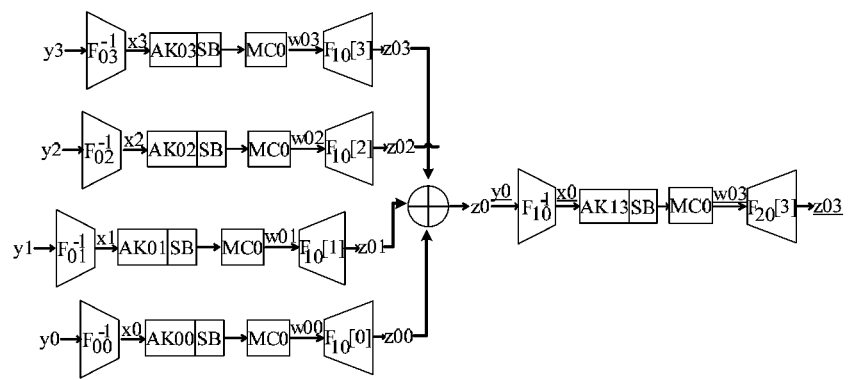
FIG. 6 is a schematic diagram of another relationship between two consecutive rounds of iterative input and output data after splitting of column computing according to an embodiment of the present invention.

That is, the calculated $z0=F_{10}(L*S(x0+k0))$, where L is a multiplier factor introduced by an MCj operation, and k0 is a key byte corresponding to x0 in this round of operation. The output z0 of the current round (the $1^{st}$ round) is used as an input $\underline{y0}$ of a next round to proceed with table lookup of the next round (the $2^{nd}$ round). During the process of generating the table of the next round (the $2^{nd}$ round), the input affine mask is $F_{10}^{-1}$ and the output mask is $F_{20}$. Therefore, according to the transformation of $F_{10}^{-1}$, z0 may be correctly mapped back to real data $\underline{x0}$. The process is shown in FIG. 6.

$$z1=z10+z11+z12+z13$$

$$z2=z20+z21+z22+z23$$

Similarly, $z3=z30+z31+z32+z33$.

For reasonableness of the foregoing equations, reference may be made to the description of z0, and no exhaustive description is given here any more.

The following clearly describes the technical solutions in the embodiments of the present invention with reference to the accompanying drawings in the embodiments of the present invention. Apparently, the described embodiments are only a part rather than all of the embodiments of the present invention. All other embodiments obtained by a person of ordinary skill in the art based on the embodiments of the present invention without creative efforts shall fall within the protection scope of the present invention.

To facilitate clear description of the technical solutions in the embodiments of the present invention, words such as "first" and "second" are used in the embodiments of the present invention to distinguish between the same items or similar items that provide basically the same functions or purposes. A person skilled in the art may understand that the words such as "first" and "second" do not restrict the number and the implementation order.

Figure 7:
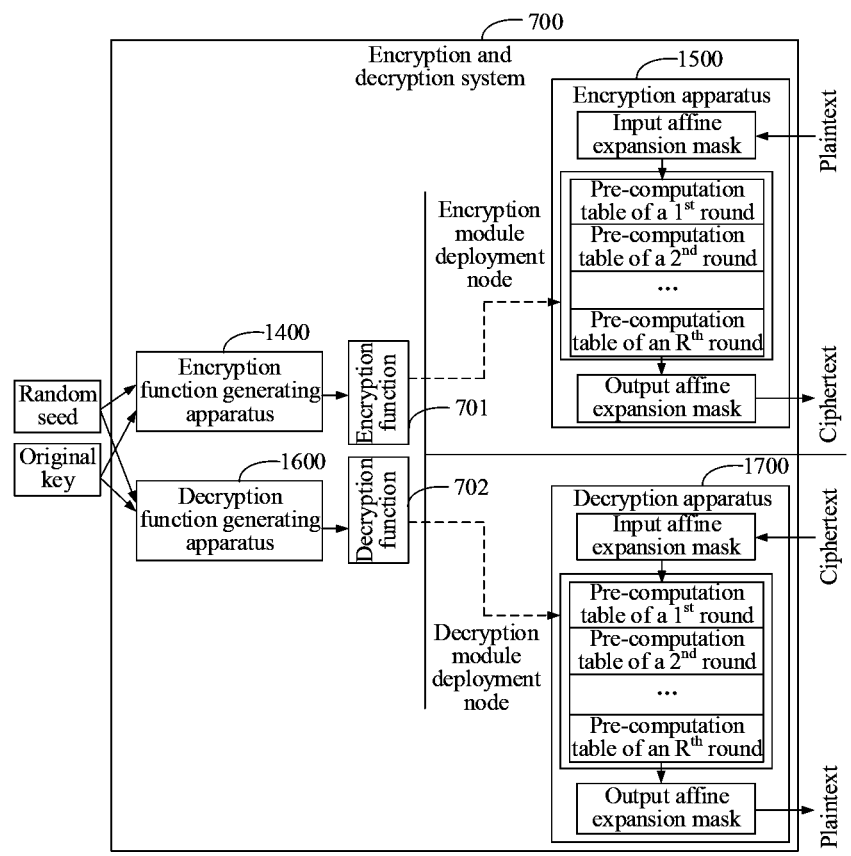
FIG. 7 is a schematic diagram of an architecture of an encryption and decryption system according to an embodiment of the present invention.

First, an encryption and decryption system architecture provided in an embodiment of the present invention is described briefly. As shown in FIG. 7, the encryption and decryption system 700 includes an encryption function generating apparatus 1400, an encryption apparatus 1500, a decryption function generating apparatus 1600, and a decryption apparatus 1700.

After receiving a random seed and an original key that are input by a user, the encryption function generating apparatus 1400 generates an encryption function 701, and then sends the encryption function 701 to the encryption apparatus 1500 of an encryption module deployment node. After receiving the random seed and the original key that are input by the user, the decryption function generating apparatus 1600 generates a decryption function 702, and then sends the decryption function 702 to the decryption apparatus 1700 of a decryption module deployment node. The encryption apparatus 1500 stores the encryption function 701. The decryption apparatus 1700 stores the decryption function 702. Both the encryption function 701 and the decryption function 702 include a pre-computation table for R-round iterative computing, where R is a positive integer.

After receiving a plaintext input by the user, the encryption apparatus 1500 obtains ciphertext corresponding to the input plaintext by means of lookup in the pre-computation table for the R-round iterative computing corresponding to the encryption function 701 according to an input affine expansion mask and an output affine expansion mask that are stored in the encryption apparatus 1500.

After receiving a ciphertext input by the user, the decryption apparatus 1700 obtains plaintext corresponding to the input ciphertext by means of lookup in the pre-computation table for the R-round iterative computing corresponding to the decryption function 702 according to the input affine expansion mask and the output affine expansion mask that are stored in the decryption apparatus 1700.

Specifically, the following embodiments will describe details of the method for generating the encryption function the encryption method performed by the encryption apparatus 1500 after it receives the plaintext that is input by the user, the method for generating the decryption function by the decryption function generating apparatus 1600 after it receives the random seed and the original key that are input by the user, and the decryption method performed by the decryption apparatus 1700 after it receives the ciphertext that is input by the user.

It should be noted that the pre-computation table is a datasheet stored correspondingly after all output results are pre-calculated according to all possible input values. Exemplarily:

To calculate a function such as $f(x)=x^2+3x+2$, x squared may be calculated first and then 3x may be calculated step by step, and then the three items are added up.

Alternatively, pre-calculation such as f(0)=2, f(1)=6, . . . may be performed.

x,f(x) is placed in a table as a record, and the value of f(x) is placed in the $x^{th}$ row of the table.

When f(x) needs to be calculated, it is only necessary to query the value corresponding to the $x^{th}$ row, and it is unnecessary to perform the step-by-step calculation according to the foregoing detailed steps. Because pre-calculation is performed in the table, the table is referred to as a pre-computation table.

Figure 8:
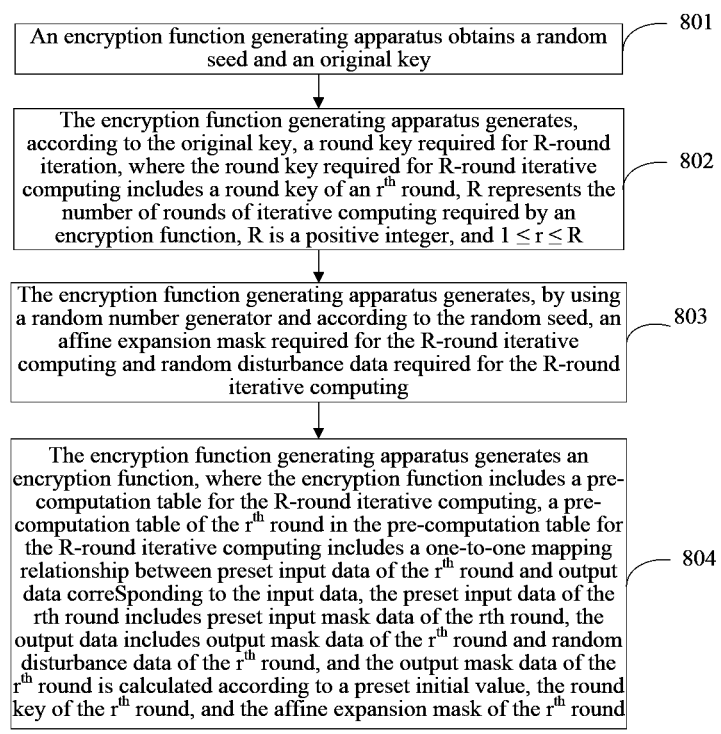
FIG. 8 is a schematic flowchart of an encryption function generating method according to an embodiment of the present invention.

An embodiment of the present invention provides an encryption function generating method. Specifically, as shown in FIG. 8, the method includes the following steps:

801. An encryption function generating apparatus obtains a random seed and an original key.

Specifically, in the encryption function generating method provided in this embodiment of the present invention, the encryption function generating apparatus needs to obtain the random seed and the original key first.

The random seed is a fixed-length bit string, and may be used to generate a random number by using a random number generator. The random number generator may be considered as a function g(x), where an input is a fixed-length random seed such as a k-bit string, and an output is a random number sequence with a length of any number of bits and serves as a random number source to be used subsequently; and a key is a group of information code, and the key is involved in the "operation" of cryptography and exerts a specific control effect on the "operation" of cryptography. The DES supports a key with a length of 64 bits, and the AES supports keys with three types of length: 128 bits, 122 bits, and 256 bits.

802. The encryption function generating apparatus generates, according to the original key, a round key required for R-round iteration, where the round key required for R-round iterative computing includes a round key of an $r^{th}$ round, R represents the number of rounds of iterative computing required by an encryption function, R is a positive integer, and $1 \leq r \leq R$.

Specifically, for the method in which the encryption function generating apparatus generates the round key required for the R-round iterative computing after obtaining the original key, reference may be made to the AES standard algorithm, and details are not described in this embodiment of the present invention.

803. The encryption function generating apparatus generates, by using the random number generator and according to the random seed, an affine expansion mask required for the R-round iterative computing and random disturbance data required for the R-round iterative computing.

Specifically, in this embodiment of the present invention, the affine expansion mask is used to transform m-bit data into n-bit data, m and n are preset positive integers, n>m, the affine expansion mask required for the R-round iterative computing includes an affine expansion mask of the $r^{th}$ round, and the random disturbance data required for the R-round iterative computing includes random disturbance data of the $r^{th}$ round.

A person skilled in the art may understand that the affine expansion mask of the $r^{th}$ round may include an input affine expansion mask of the $r^{th}$ round and an output affine expansion mask of the $r^{th}$ round, which is not specifically limited in this embodiment of the present invention.

Preferably, in this embodiment of the present invention, the affine expansion mask is determined according to $F(x)=A*x+b$, where x is an m-dimensional column vector, A and b are matrixes generated by using the random number generator and according to the random seed, A is a full-column-rank matrix on binary field with size of n times m, in other words, A is an (n*m)-sized full-column-rank matrix on binary field; b is an n-dimensional column vector, and F(x) can be determined according to A and b.

It should be noted that in this embodiment of the present invention, the affine expansion mask is determined according to $F(x)=A*x+b$, the number n of rows of the matrix A is greater than the number m of columns, and therefore, by means of an affine transformation, x can be expanded from an m-dimensional column vector into an n-dimensional column vector. Specially, to prevent loss of information after the affine transformation, the matrix A needs to be a full-column-rank matrix (that is, all column vectors are linearly independent, rank(A)=m); for the column vector b, no requirement is imposed and its value is arbitrary.

A person skilled in the art may understand that, during the process of generating the pre-computation table of the $r^{th}$ round, if the preset input data of the $r^{th}$ round includes mask data of the $(r-1)^{th}$ round, that is, if the preset input data of the $r^{th}$ round is $0-(2^n-1)$, in order to ensure mutual counteraction between mask layers that correspond to each other in tandem, the input affine expansion mask required for the iterative computing of the $r^{th}$ round is reciprocally an inverse function of the output affine expansion mask required for the iterative computing of the $(r-1)^{th}$ round, and $1 \leq r \leq R$.

Exemplarily, it is assumed that r=1, the input affine expansion mask required for the iterative computing of the $1^{st}$ round is $F_0^{-1}$, and $F_0$ is the input affine expansion mask in the encryption process; it is assumed that r=3, the input affine expansion mask required for the iterative computing of the $3^{rd}$ round is $F_2^{-1}$, and $F_2$ is the output affine expansion mask required for the iterative computing of the $2^{nd}$ round.

A person skilled in the art may understand that, according to the random seed, what are generated by using the random number generator are actually A and b. After A and b are determined, $F(x)=A*x+b$ can be determined, and its inverse function can also be determined. Therefore, according to the random seed, all affine expansion masks listed above can be generated by using the random number generator.

In addition, in this embodiment of the present invention, compared with the prior art, the random disturbance data required for the R-round iterative computing further needs to be generated according to the random seed, so that the random disturbance data is used for subsequent step 804.

It should be noted that there is no certain order of performing step 802 and step 803; step 802 may be performed before step 803; or step 803 may be performed before step 802, which is not specifically limited in this embodiment of the present invention.

804. The encryption function generating apparatus generates an encryption function, where the encryption function includes a pre-computation table for the R-round iterative computing, a pre-computation table of the $r^{th}$ round in the pre-computation table for the R-round iterative computing includes a one-to-one mapping relationship between preset input data of the $r^{th}$ round and output data corresponding to the input data, the preset input data of the $r^{th}$ round includes preset input mask data of the $r^{th}$ round, the output data includes output mask data of the $r^{th}$ round and random disturbance data of the $r^{th}$ round, and the output mask data of the $r^{th}$ round is calculated according to a preset initial value, the round key of the $r^{th}$ round, and the affine expansion mask of the $r^{th}$ round.

The mask data is data yielded after real data undergoes an affine expansion transformation.

Preferably, m may be preset to an input/output length of an S-box whose input length is the same as its output length.

That the output mask data of the $r^{th}$ round is calculated according to a preset initial value, the round key of the $r^{th}$ round, and the affine expansion mask of the $r^{th}$ round includes:

the output mask data of the $r^{th}$ round is calculated with reference to the S-box according to the preset initial value, the round key of the $r^{th}$ round, and the affine expansion mask of the $r^{th}$ round.

It should be noted that, the S-box, whose input length is the same as its output length, may be an S-box in the AES, and may also be an S-box in China commercial encryption standard 4 (SM Standard 4, SMS4), which is not specifically limited by the present invention.

Specifically, for the method for obtaining the mask data, reference may be made to the white-box mask data obtaining method in the prior art, and details are not described herein again.

It should be noted that the preset initial value in this embodiment of the present invention is enumeration of all possible table lookup input values. For example, the preset initial value may be enumeration of 0–($2^n$–1), or the preset initial value may be enumeration of 0–($2^m$–1), which is not specifically limited in this embodiment of the present invention.

It can be learned from the preamble content of the description of embodiments that, each round of iterative computing may include multiple pre-computation tables of a minimum unit. In this embodiment of the present invention, the affine transformation of the output affine expansion mask is performed during the process of generating each pre-computation table of a minimum unit. Therefore, the pre-computation table of a minimum unit may include $2^n$ records, but the mask data corresponding to the real data actually occupies only $2^m$ records, so that ($2^n$–$2^m$) records in the pre-computation table of a minimum unit are available for filling in the random disturbance data.

Specially, the encryption function in this embodiment of the present invention may specifically be a white-box AES encryption function, which is not specifically limited in this embodiment of the present invention.

Figure 9:
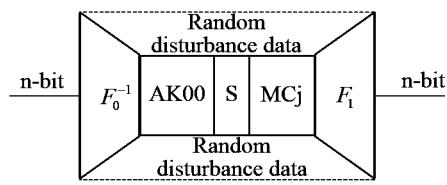
FIG. 9 is a schematic composition diagram of a pre-computation table according to an embodiment of the present invention.

Exemplarily, for a specific S-box in a specific round of iterative computing in the AES and a corresponding round key byte k, their input and output affine expansion masks are randomly selected. Here an input affine expansion mask is used as an example: it is assumed that F(x)=A*x+b, where x is an 8-dimensional column vector, A is an (n*m)-sized full-column-rank matrix on binary field, that means, A is a full-column-rank matrix on binary field, and A is a matrix with size of n×m; b is an n-dimensional column vector, and the operation of each matrix element is an operation in the binary field. After F(x) and F (x) are selected, let the affine subset corresponding to the affine transformation F(x)=A*x+b be Y. Y is defined as:

$$Y=\{y=A\cdot x+b|x\in(GF_2)^8\},$$

then the pre-computation table T'(y) shown in FIG. 9 may be calculated in the following way:

(1) If an n-bit input value is an element in the subset Y, that is, x exists which makes $F_0$(x)=y, then let T'(y) be $F_1$(L*S(x+k)), where $F_1$(x) is an output affine expansion mask, L is a multiplier factor introduced by an MCj operation, and T'(y) is mask data;

(2) If an n-bit input value is an element outside the subset Y, that is, no x exists, which makes $F_0$(x)=y, then T,(y) is set to random disturbance data, whose randomicity comes from the random seed and the random number generator.

With reference to the foregoing encryption function generating method, the following gives an example of an entire process of generating an encryption function by an encryption function generating apparatus. It is assumed that m=8, n=16, R=10, and I=16, where I is the number of bytes of a round key required for each round of iterative computing, then:

First, receive a random seed and an original key K that are input by a user;

Second, the original key K is expanded to 10 16-byte round keys RK[r], where RK[r][i] denotes the $i^{th}$ round key byte of the $r^{th}$ round, 1≤r≤10, and 0≤i≤15;

Third, by using a random stream generated by the random number generator, generate an affine expansion mask required for 10-round iterative computing and random disturbance data required for the 10-round iterative computing; wherein the random stream is a random number sequence or bitstream which comprising a plurality of random numbers; and Fourth, generate an encryption function:

It is assumed that a pre-computation table Table[round][col][row_in][row_out](y) denotes a pre-computation table of a $round^{th}$ round and a $col^{th}$ column, in which the input byte is in a $row\_in^{th}$ row and the output byte is in a $row\_out^{th}$ row, and which includes $2^{16}$ records. The input value y is 16 bits, and the output value is also 16 bits.

(a) Go over all the following parameters, and then perform subsequent steps:
 i. round: number of rounds;
 ii. col: the number of a column of the current round;
 ii. row_in: the row number of a row_in which the input byte of the current column is located; and
 iv. row_out: the row number of a row_in which the output byte of the current column is located;

Empty the pre-computation table Table[round][col][row_in][row_out]($2^{16}$ blank locations)

(b) Pre-Compute Mask Data

First, several symbols are arranged. During the computing process of the mask data in the pre-computation table, each intermediate state value is denoted by a corresponding symbol:

y→($F_{r-1}^{-1}$)→x→AK SB MCj→w→$F_r$→z, where $F_{r-1}^{-1}$ is an input affine expansion mask of the $r^{th}$ round, and F is an output affine expansion mask of the $r^{th}$ round.

Specifically, let the affine subset corresponding to the affine transformation $F_r$(x)=A*x+b be Y. Y is defined as: Y={y=A·x+b|x∈$(GF_2)^8$}.

According to an enumerated value 0000-FFFF of y, if a 16-bit input value of y is an element in the subset Y={y=A·x+b|x∈$(GF_2)^8$}, that is, an x exists which makes $F_r$(x)=y, then x may undergo an (AK' SB, MCj) operation to yield w, and w undergoes an affine transformation of the output affine expansion mask $F_r$(x) to yield mask data T'(y), where T'(y)=$F_r$(L*S(x+k)), and L is a multiplier factor introduced by the MCj operation.

Exemplarily, a process of generating the mask data in the pre-computation table Table[1][1][1][1] is as follows:

For all enumerated data (y=0-FFFF):

If x exists, which makes $F_0$(x)=y, then z=$F_1$(MC1(SB(AK(x))) and x=$F_0^{-1}$(y).

The $y^{th}$ blank location of the pre-computation table Table [1][1][1][1] is filled with a value z, and therefore, when the table is in use, the value of z may be obtained by querying Table[1][1][1][1](y).

Certainly, an enumerated value of x may also be 00-FF, so as to obtain the mask data in the pre-computation table. During the process of calculating the mask data, each intermediate state value is denoted by a corresponding symbol:

x→AK SB MCj→w→$F_r$→z, x→$F_{r-1}$→y, where $F_{r-1}$ is an input affine expansion mask of the $r^{th}$ round, and is also an output affine expansion mask of the $(r-1)^{th}$ round; and F is an output affine expansion mask of the $r^{th}$ round, and is also an input affine expansion mask of the $(r+1)^{th}$ round.

Exemplarily, a process of generating the mask data in the pre-computation table Table[0][1][1][1] is as follows:

For all real data (x=0-FF):

$y=F_0(x), z=F_1(MC1(SB(AK(x))))$

The $y^{1h}$ blank location of the pre-computation table Table [0][1][1][1] is filled with a value z, and therefore, when the table is in use, the value of z may be obtained by querying Table[0][1][1][1](y).

(c) Fill with Random Disturbance Data

All remaining blank locations ($2^{16}$-$2^8$) of the pre-computation table Table[round][col][row_in][row_out] are filled with the random disturbance data of a 16-bit value generated by the random number generator.

The following measures security of the present invention, and the security is analyzed below:

Because plenty of random disturbance data is added in a pre-computation table of an encryption function, an attacker cannot use the prior art to recover key bytes included in the pre-computation table at computational complexity of $2^{25}$ until the attacker finds a real pre-computation table. Therefore, the attacker has to attempt all possible affine subsets, where the number of attempts depends on the number of affine subsets.

The number N(n,m) of m-dimensional affine sub-space in n-dimensional binary field space ($GF_2$) is $$N(n, m) = 2^{n-m} \frac{\prod_{i=0}^{n-m-1} (2^n - 2^i)}{\prod_{i=0}^{n-m-1} (2^{n-m} - 2^i)},$$

which is proved below:

An affine transformation y=Ax+b is taken into account, where A is an (n*m)-sized full-column-rank matrix on binary field, in other words, A is a full-column-rank matrix on binary field with size of n times m; b is an n-dimensional vector, and n>=m. An n*n reversible matrix P and an m*m reversible matrix Q exist which make:

$$A = P^{-1} \cdot \binom{I_m}{0} \cdot Q,$$

where $I_m$ is an identity matrix with a size of m*m, and is substituted into y=Ax+b to yield $$\binom{Qx}{0} = P(y+b) = \binom{P_1}{P_2}(y+b).$$

Because Qx may have any value, the equation is equivalent to $P_2 y = P_2 b = b'$, where $P_2$ is an (n-m)*n matrix whose rank is n-m ($P_2$ is a dual matrix of A), and b' is an (n-m)-dimensional column vector. Further, it can be seen that y belongs to the affine subset Y={y=A·x+b|x∈($GF_2$)$^m$} and is equivalent to $P_2 y = b'$. Therefore, with the values of $P_2$ and b', the affine subset Y can be uniquely determined.

In addition, considering that, for a reversible matrix R of any (n-m)*(n-m) size, the affine subset defined by $P_2 y = b'$ is the same as that defined by $(RP_2)y = Rb'$, and therefore, the duplicate count needs to be removed when the number of affine subsets is calculated. Therefore, we can learn that the number N(n,m) of m-dimensional affine subsets in n-dimensional binary field space is equal to:

$$\frac{\#\{P_2 \mid \mathrm{rank}(P_2) = n - m\} \times \#\{b' \mid b' \in GF_2^{n-m}\}}{\#\{R \mid \mathrm{rank}(R) = n - m\}} =$$

$$\frac{M(n, n-m) \times 2^{n-m}}{M(n-m, n-m)} 2^{n-m} \frac{\prod_{i=0}^{n-m-1} (2^n - 2^i)}{\prod_{i=0}^{n-m-1} (2^{n-m} - 2^i)}.$$

Because the number N(n,m) of m-dimensional affine sub-space in the n-dimensional binary field space $(GF_2)^n$ is $$N(n, m) = 2^{n-m} \frac{\prod_{i=0}^{n-m-1} (2^n - 2^i)}{\prod_{i=0}^{n-m-1} (2^{n-m} - 2^i)},$$

in order to crack an generation algorithm of an n-bit affinely expanded encryption function, an attacker has to exhaustively try all of N(n,m) different m-dimensional affine subsets, and then attempt to recover the key, where the computational complexity is $$N(n, m) + 2^{25} \cdot \max\left\{1, \frac{N(n, m)}{2^{4n}}\right\},$$

which is proved below:

The attacker has to attempt all N(n, m) possible affine subsets one by one. When an affine subset is selected, the attacker may use the following method to determine whether the selected affine subset is correct: according to the process of generating a pre-computation table, it can be learned that a result of table lookup and XOR summation for all elements in an affine subset Y is necessarily equal to 0. Let X be original m-dimensional binary field space, then $$\bigoplus_{y \in Y} T'(y) =$$

$$\bigoplus_{x \in X} F_1(S(x \oplus k)) = \bigoplus_{x' \in X} F_1(x') = \bigoplus_{x' \in X} (A_1 x' \oplus b_1) = A_1 \left(\bigoplus_{x' \in X} x'\right) = 0.$$

For an expanded input byte y, four such pre-computation tables T' exist, and therefore, the four pre-computation tables provide a 4n-bit determining condition. With random values, the probability that the summations of all the four pre-computation tables are 0s is $2^{-4}n$. After selecting an affine subset, if the attacker discovers that the XOR sum of a pre-computation table is non-zero, it may be determined that the affine subset is surely incorrect.

When N(n,m)<$2^{4n}$ and when finding an affine subset whose XOR sum is 0, the attacker may almost uniquely determine that this is the correct subset, and then perform the second step of key recovery.

When N(n,m)>$2^{4n}$ and when the attacker finds an affine subset whose XOR sum is 0, the subset is not necessarily correct. Therefore, the attacker has to attempt the second step of key recovery, and the total number of required attempts is N(n,8)/$2^{4n}$.

Therefore, the total computational complexity of this attack method is the complexity of going over all affine subsets in addition to the second step of attempting to recover the key, which may be expressed as:

$$N(n, 8) + 2^{25} \cdot \max\left\{1, \frac{N(n, 8)}{2^{4n}}\right\},$$

and the proof is complete.

Exemplarily, according to the foregoing formula, the following presents security and memory occupation in this embodiment of the present invention when m=8 and n ranges from 9 to 23, as shown in Table 3:

TABLE 3

| | Expansion size | | | | |
|---|---|---|---|---|---|
| | n = 9 | n = 10 | n = 13 | n = 12 | n = 13 |
| Attack complexity | $2^{25}$ | $2^{25}$ | $2^{28.60}$ | $2^{37.70}$ | $2^{46.74}$ |
| Memory requirement | 360 KB | 800 KB | 1.72 MB | 3.75 MB | 8.13 MB |

| | Expansion size | | | | |
|---|---|---|---|---|---|
| | n = 14 | n = 15 | n = 16 | n = 17 | n = 18 |
| Attack complexity | $2^{55.76}$ | $2^{64.78}$ | $2^{73.78}$ | $2^{82.78}$ | $2^{91.79}$ |
| Memory requirement | 17.5 MB | 37.5 MB | 80 MB | 170 MB | 360 MB |

| | Expansion size | | | | |
|---|---|---|---|---|---|
| | n = 12 | n = 20 | n = 21 | n = 22 | n = 23 |
| Attack complexity | $2^{100.79}$ | $2^{109.79}$ | $2^{138.79}$ | $2^{127.79}$ | $2^{136.79}$ |
| Memory requirement | 760 MB | 1.56 GB | 3.28 GB | 6.88 GB | 14.38 GB |

Because an extreme computing capability of a mainframe computer currently is appropriately $2^{60}$, it can be seen from Table 3 that when n≥15, the security of this solution can satisfy security requirements in most application scenarios.

In addition, in a case in which the white-box encryption function generating method is disclosed, even if the attacker has cracked a pre-computation table, we can change the random seed to prevent the attacker from cracking new pre-computation tables generated subsequently. Therefore, in this embodiment of the present invention, range of attack can be further reduced by protecting the random seed.

Therefore, based on the foregoing encryption function generating method provided in this embodiment of the present invention, it can be learned from the foregoing analysis that the present invention can ensure the confidentiality of a key used in a white-box encryption function if a white-box encryption function generating method is disclosed.

Figures 10, 11:
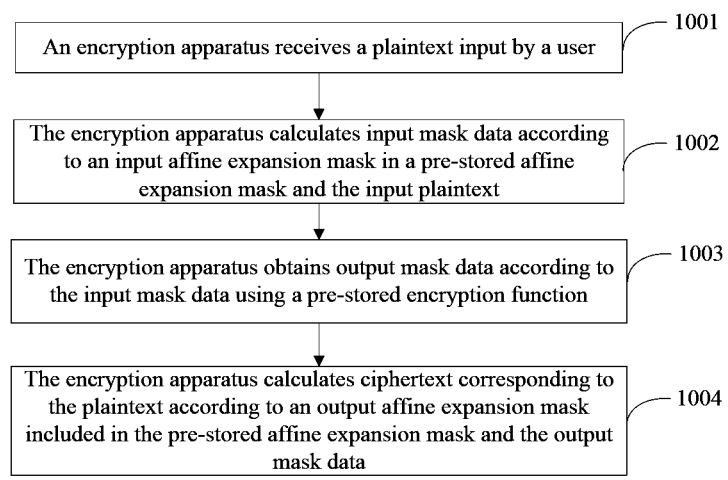
FIG. 10 is a schematic flowchart of an encryption method according to an embodiment of the present invention.
FIG. 11 is a schematic composition diagram of a plaintext according to an embodiment of the present invention.

Another embodiment of the present invention provides an encryption method. Specifically, as shown in FIG. 10, the method includes the following steps:

1001. An encryption apparatus receives a plaintext input by a user.

1002. The encryption apparatus calculates input mask data according to an input affine expansion mask in a pre-stored affine expansion mask and the plaintext.

Specifically, in this embodiment of the present invention, the affine expansion mask is an affine transformation matrix for mapping m-bit data to n-bit data, where m and n are preset positive integers, and n>m.

In this way, after the affine expansion transformation in step 1002 is performed, the plaintext can be expanded from an m-dimensional column vector to an n-dimensional column vector. Exemplarily, it is assumed that the plaintext input in this embodiment of the present invention is 128 bits, the input plaintext can be expanded from a 128-bit length to a 16n-bit length by means of the affine transformation of the input affine expansion mask.

1003. The encryption apparatus obtains output mask data according to the input mask data using pre-computation table of a pre-stored encryption function.

The pre-stored encryption function includes a pre-computation table for R-round iterative computing, a pre-computation table of an $r^{th}$ round in the pre-computation table for the R-round iterative computing includes a one-to-one mapping relationship between preset input data of the $r^{th}$ round and output data corresponding to the input data, the preset input data of the $r^{th}$ round includes preset input mask data of the $r^{th}$ round, the output data includes output mask data of the $r^{th}$ round and random disturbance data of the $r^{th}$ round, and the output mask data of the $r^{th}$ round is calculated according to a preset initial value, a round key of the $r^{th}$ round, and an affine expansion mask of the $r^{th}$ round, the affine expansion mask of the $r^{th}$ round and the random disturbance data of the $r^{th}$ round are generated by an encryption function generating apparatus according to a received random seed and by using a random number generator, 1≤r≤R, R represents the number of rounds of iterative computing required for generating the encryption function.

A person skilled in the art may understand that the affine expansion mask of the $r^{th}$ round may include an input affine expansion mask of the $r^{th}$ round and an output affine expansion mask of the $r^{th}$ round, which is not specifically limited in this embodiment of the present invention.

Preferably, in this embodiment of the present invention, the affine expansion mask is determined according to F(x)=A*x+b, where x is an m-dimensional column vector, A and b are matrixes generated by using the random number generator and according to the random seed, A is an (n*m)-sized full-column-rank matrix on binary field, b is an n-dimensional column vector, and F(x) can be determined according to A and b.

Specifically, the pre-stored encryption function required in the encryption process in this embodiment of the present invention is the encryption function generated as described above before. For the specific generation method, reference may be made to the embodiment as described above.

1004. The encryption apparatus calculates ciphertext corresponding to the plaintext according to an output affine expansion mask included in the pre-stored affine expansion mask and the output mask data.

With reference to the foregoing encryption method, the following gives an example in which the encryption apparatus encrypts the input plaintext. It is assumed that m=8, n=16, R=10, and I=16, where I is the number of bytes of a round key required for each round of iteration, then:

First, the encryption apparatus receives a plaintext input by a user.

Figure 13:
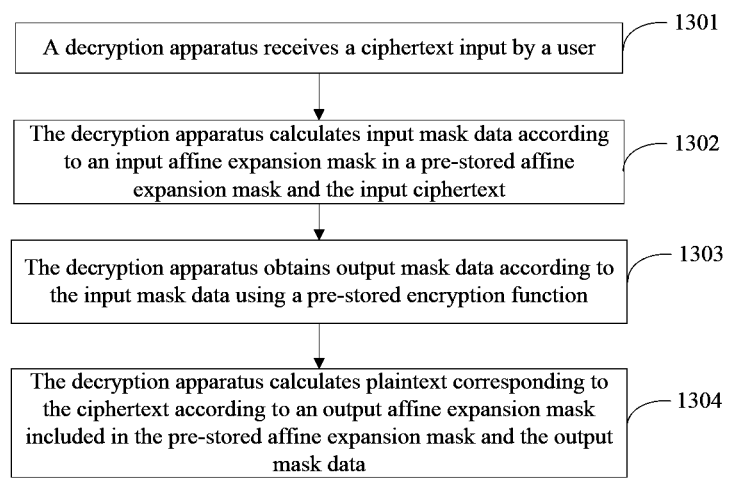
FIG. 13 is a schematic flowchart of a decryption method according to an embodiment of the present invention.

It is assumed that a given plaintext is P, which includes 16 bytes in total. As shown in FIG. 13, P[i] is used to represent an $i^{th}$ byte. That is, P=P[0]||P[1]|| . . . ||P[15], where a||b refers to connecting binary strings a and b.

Second, it is assumed that the pre-stored input affine expansion mask is F[0], if F[0][i](x) represents the input affine expansion mask of the $i^{th}$ byte, then F[0][i](x)=A[0][i](x)+b[0][i]. Therefore, the encryption apparatus calculates the input mask data P'=F[0][P] corresponding to the input plaintext according to the input affine expansion mask, where P'[i]=F[0][i](P[i]) refers to changing the $i^{th}$ byte P[i] of the plaintext to P' [i] with a length of 2 bytes (16 bits) by means of affine expansion mapping. Therefore, the total length of P' is 32 bytes, that is, 256 bits, which is twice that of the length of the plaintext P.

Third, an encryption process (iterative table lookup)

It can be learned from the embodiment as described above that, the encryption function includes a pre-computation table for the R-round iterative computing, a pre-computation table of the $r^{th}$ round in the pre-computation table for the R-round iterative computing includes a one-to-one mapping relationship between preset input data of the $r^{th}$ round and output data corresponding to the input data, the preset input data of the $r^{th}$ round includes preset input mask data of the $r^{th}$ round, and the output data includes output mask data of the $r^{th}$ round and random disturbance data of the $r^{th}$ round. Therefore, the encryption apparatus may use the following method to obtains output mask data according to the input mask data using a pre-stored encryption function:

It is assumed that a pre-computation table Table[r][col][row_in][row_out](y) denotes a pre-computation table of an $r^{th}$ round and a $col^{th}$ column, in which the input byte is in a row_in$^{th}$ row and the output byte is in a row_out$^{th}$ row, and which includes $2^{16}$ records. The input value y is 16 bits, and the output value is also 16 bits.

a. Let the initial iteration state S[0] be P', and use S[r][k] to represent the $k^{th}$ sub-block (each sub-block has 2 bytes) of the $r^{th}$-round iteration state S[r].

b. Iterate r rounds cyclically, perform table lookup from S[r] and calculate S[r+1]:

for r=1 . . . 10 (the number of rounds)
for col=0 . . . 3 (the numbers of columns of the currently calculated input bytes)
for row_in =0 . . . 3 (the numbers of rows of the currently calculated input bytes)
for row_out=0 . . . 3 (output bytes in which row of the currently calculated column)

$S[r+1][4*col+row\_out]=$ $Table[r][col][0][row\_out](S[r][4*col+0])\oplus$ $Table[r][col][1][row\_out](S[r][4*col+1])\oplus$ $Table[r][col][2][row\_out](S[r][4*col+2])\oplus$ $Table[r][col][3][row\_out](S[r][4*col+3]).$ That is, the table is split into 4 sub-tables for calculating separately, and finally, results are XORed, where $\oplus$ represents XOR.

Exemplarily, it is assumed that col=0 and row_out=3, after the sub-block k=4*col+row_out=3 undergoes 10 rounds of table lookup, the corresponding mask data is S[10][3]=Table[9][0][0][3](S[9][0]) $\oplus$ Table[9][0][1][3](S[9][1]) $\oplus$ Table[9][0][2][3](S[9][2]) $\oplus$ Table[9][0][3][3](S[9][3]).

The output mask data is $$P'' = P''[0]\|P''[1]\| \ldots \|P''[15]$$
$$= s[10][0]\|s[10][1]\| \ldots \|s[10][15].$$

Fourth, an inverse operation process of the output mask data.

After the output mask data is obtained, the encryption apparatus obtains a state S[10], which is a 256-bit binary string. In this case, S[10] is mapped back to the ciphertext $C=F[10]^{-1}(S[10])$ by using an inverse function of the affine expansion mask of the last round.

Specifically, the calculation process of each ciphertext byte C[i] is $C[i]=F[10][i]^{-1}(S[10][i])$.

Based on an encryption method provided in this embodiment of the present invention, because this embodiment of the present invention uses an encryption function generated in embodiments as described above to encrypt a plaintext, considering that encryption function security analysis as described above shows that the encryption function can ensure the confidentiality of a key used in a white-box encryption function if a white-box encryption function generating method is disclosed, then the encryption method provided in this embodiment of the present invention can also ensure the confidentiality of the key used in the white-box encryption function if the white-box encryption function generating method is disclosed.

Figure 12:
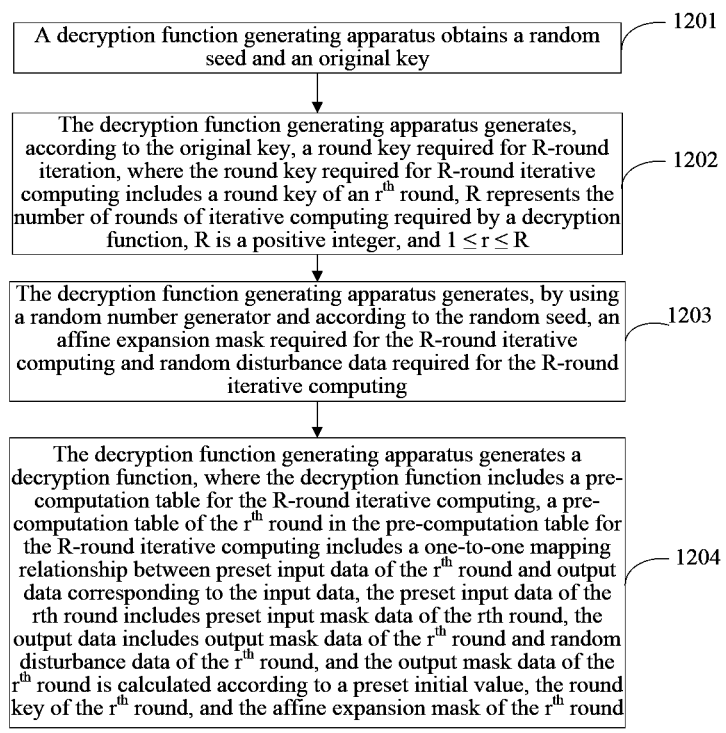
FIG. 12 is a schematic flowchart of a decryption function generating method according to an embodiment of the present invention.

Another embodiment of the present invention provides a decryption function generating method. Specifically, as shown in FIG. 12, the method includes the following steps:

1201. A decryption function generating apparatus obtains a random seed and an original key.

Specifically, in the decryption function generating method provided in this embodiment of the present invention, the decryption function generating apparatus needs to obtain the random seed and the original key first.

The random seed is a fixed-length bit string, and may be used to generate a random number by using a random number generator. The random number generator may be considered as a function g(x), where an input is a fixed-length random seed such as a k-bit string, and an output is a random number sequence with a length of any number of bits and serves as a random number source to be used subsequently; and a key is a group of information code, and the key participates in the "operation" of cryptography and exerts a specific control effect on the "operation" of cryptography. The DES supports a key with a length of 64 bits, and the AES supports keys with three types of length: 128 bits, 192 bits, and 256 bits.

1202. The decryption function generating apparatus generates, according to the original key, a round key required for R-round iteration, where the round key required for the R-round iterative computing includes a round key of an $r^{th}$ round, R represents the number of rounds of iterative computing required by a decryption function, R is a positive integer, and $1 \leq r \leq R$.

Specifically, for the method for generating, by the decryption function generating apparatus, the round key required for the R-round iterative computing after the obtaining of the original key, reference may be made to the AES standard algorithm, and details are not described in this embodiment of the present invention.

1203. The decryption function generating apparatus generates, by using the random number generator and according to the random seed, an affine expansion mask required for the R-round iterative computing and random disturbance data required for the R-round iterative computing.

In this embodiment of the present invention, the affine expansion mask is an affine transformation matrix used to affinely transform m-bit data into n-bit data, m and n are preset positive integers, n>m, the affine expansion mask required for the R-round iterative computing includes an affine expansion mask of the $r^{th}$ round, and the random disturbance data required for the R-round iterative computing includes random disturbance data of the $r^{th}$ round.

A person skilled in the art may understand that the affine expansion mask of the $r^{th}$ round may include an input affine expansion mask of the $r^{th}$ round and an output affine expansion mask of the $r^{th}$ round, which is not specifically limited in this embodiment of the present invention.

Preferably, in this embodiment of the present invention, the affine expansion mask is determined according to $F(x)=A*x+b$, where x is an m-dimensional column vector, A and b are matrixes generated by using the random number generator and according to the random seed, A is an (n*m)- sized full-column-rank matrix on binary field, b is an n-dimensional column vector, and F(x) can be determined according to A and b.

It should be noted that in this embodiment of the present invention, the affine expansion mask is determined according to $F(x)=A*x+b$, the number n of rows of the matrix A is greater than the number m of columns, and therefore, by means of an affine transformation, x can be expanded from an m-dimensional column vector into an n-dimensional column vector. Specially, to prevent loss of information after the affine transformation, the matrix A needs to be a full-column-rank matrix (that is, all column vectors are linearly independent, rank(A)=m); for the column vector b, no requirement is imposed and its value is arbitrary.

A person skilled in the art may understand that, during the process of generating the pre-computation table of the $r^{th}$ round, if the preset input data of the $r^{th}$ round includes mask data of the $(r-1)^{th}$ round, that is, if the preset input data of the $r^{th}$ round is $0-(2^n-1)$, in order to ensure mutual counteraction between mask layers that correspond to each other in tandem, the input affine expansion mask required for the iterative computing of the $r^{th}$ round is reciprocally an inverse function of the output affine expansion mask required for the iterative computing of the $(r-1)^{th}$ round, and $1 \leq r \leq R$.

Exemplarily, it is assumed that r=1, the input affine expansion mask required for the iterative computing of the $1^{st}$ round is $F_0^{-1}$, and $F_0$ is the input affine expansion mask in the decryption process; it is assumed that r=3, the input affine expansion mask required for the iterative computing of the $3^{rd}$ round is $F_2^{-1}$, and $F_2$ is the output affine expansion mask required for the iterative computing of the $2^{nd}$ round.

A person skilled in the art may understand that, according to the random seed, what are generated by using the random number generator are actually A and b. After A and b are determined, $F(x)=A*x+b$ can be determined, and its inverse function can also be determined. Therefore, according to the random seed, all affine expansion masks listed above can be generated by using the random number generator.

In addition, in this embodiment of the present invention, compared with the prior art, the random disturbance data required for the R-round iterative computing further needs to be generated according to the random seed, so that the random disturbance data is used for subsequent step 1204.

It should be noted that there is no certain order of performing step 1202 and step 1203; step 1202 may be performed before step 1203; or step 1203 may be performed before step 1202, which is not specifically limited in this embodiment of the present invention.

1204. The decryption function generating apparatus generates a decryption function, where the decryption function includes a pre-computation table for the R-round iterative computing, a pre-computation table of the $r^{th}$ round in the pre-computation table for the R-round iterative computing includes a one-to-one mapping relationship between preset input data of the $r^{th}$ round and output data corresponding to the input data, the preset input data of the $r^{th}$ round includes preset input mask data of the $r^{th}$ round, the output data includes output mask data of the $r^{th}$ round and random disturbance data of the $r^{th}$ round, and the output mask data of the $r^{th}$ round is calculated according to a preset initial value, the round key of the $r^{th}$ round, and the affine expansion mask of the $r^{th}$ round.

The mask data is data yielded after real data undergoes an affine expansion transformation.

Preferably, m may be preset to an input/output length of an S-box whose input length is the same as its output length.

That the output mask data of the $r^{th}$ round is calculated according to a preset initial value, the round key of the $r^{th}$ round, and the affine expansion mask of the $r^{th}$ round includes:

the output mask data of the $r^{th}$ round is calculated with reference to the S-box according to the preset initial value, the round key of the $r^{th}$ round, and the affine expansion mask of the $r^{th}$ round.

It should be noted that, the S-box, whose input length is the same as its output length, may be an S-box in the AES, and may also be an S-box in SMS4, which is not specifically limited by the present invention.

Specifically, for the method for obtaining the mask data, reference may be made to the white-box mask data obtaining method in the prior art, and details are not described herein again.

It should be noted that the preset initial value in this embodiment of the present invention is enumeration of all possible table lookup input values. For example, the preset initial value may be enumeration of $0-(2^n-1)$, or the preset initial value may be enumeration of $0-(2^m-1)$, which is not specifically limited in this embodiment of the present invention.

It can be learned from the preamble content of the description of embodiments that, each round of iterative computing may include multiple pre-computation tables of a minimum unit. In this embodiment of the present invention, the affine transformation of the output affine expansion mask is performed during the process of generating each pre-computation table of a minimum unit. Therefore, the pre-computation table of a minimum unit may include $2^n$ records, but the mask data corresponding to the real data actually occupies only $2^m$ records, so that $(2^n-2^m)$ records in the pre-computation table of a minimum unit are available for filling in the random disturbance data.

Exemplarily, for a specific S-box in a specific round of iterative computing in the AES and a corresponding round key byte k, their input and output affine expansion masks are randomly selected. Here an input affine expansion mask is used as an example: it is assumed that $F_0(x)=A*x+b$, where x is an 8-dimensional column vector, A is a full-column-rank matrix on binary field with size of n times 8, b is an n-dimensional column vector, and the operation of each matrix element is an operation on the binary field. After $F_0(x)$ and $F_1(x)$ are selected, let the affine subset corresponding to the affine transformation $F_0(x)=A*x+b$ be Y. Y is defined as:

$$Y=\{y=A\cdot x+b|x\in(GF)^8\},$$

then the pre-computation table T'(y) shown in FIG. 8 may be calculated in the following way:

(1) If an n-bit input value is an element in the subset Y, that is, x exists which makes $F_0(x)=y$, then let T'(y) be $F_1(L*S(x+k))$, where $F_1(x)$ is an output affine expansion mask, L is a multiplier factor introduced by an MCj operation, and T'(y) is mask data; (2) If an n-bit input value is an element outside the subset Y, that is, no x exists which makes $F_0(x)=y$, then T'(y) is set to random disturbance data, whose randomicity comes from the random seed and the random number generator. It should be noted that, as mentioned in the preamble part of the description of embodiments, due to elaborate design of the AES, a decryption process may also be written in an equivalent form similar to $SR^{-1}$ (AK'SB$^{-1}$ MC$^{-1}$) $SR^{-1}$ (AK' SB$^{-1}$ MC$^{-1}$) . . . $SR^{-1}$ (AK' SB$^{-1}$ MC$^{-1}$). Therefore, for the example of using a decryption function generating apparatus to generate a decryption function with reference to the foregoing decryption function generating method, reference may be made to the example of using an encryption function generating apparatus to generate an encryption function as described above.

Specifically, for security analysis of the present invention, reference may be made to the security analysis in the method for generating an encryption function by an encryption function generating apparatus in embodiments as described above, and details are not described herein again.

Therefore, based on the foregoing decryption function generating method provided in this embodiment of the present invention, it can be learned from the security analysis that the present invention can keep security of a key in a white-box decryption function in a case in which a white-box decryption function generating method is disclosed.

Another embodiment of the present invention provides a decryption method. Specifically, as shown in FIG. 13, the method includes the following steps:

1301. A decryption apparatus receives a ciphertext input by a user.

1302. The decryption apparatus calculates input mask data according to an input affine expansion mask in a pre-stored affine expansion mask and the ciphertext.

Specifically, in this embodiment of the present invention, the affine expansion mask is an affine transformation matrix for mapping m-bit data to n-bit data, where m and n are preset positive integers, and n>m.

In this way, after the affine expansion transformation in step 1302 is performed, the ciphertext can be expanded from an m-dimensional column vector to an n-dimensional column vector. Exemplarily, it is assumed that the ciphertext input in this embodiment of the present invention is 128 bits, the input ciphertext can be expanded from a 128-bit length to a 16n-bit length by means of the affine transformation of the input affine expansion mask.

1303. The decryption apparatus obtains output mask data according to the input mask data using pre-computation table of a pre-stored encryption function.

The pre-stored decryption function includes a pre-computation table of R-round iterative computing, a pre-computation table of an $r^{th}$ round in the pre-computation table for the R-round iterative computing includes a one-to-one mapping relationship between preset input data of the $r^{th}$ round and output data corresponding to the input data, the preset input data of the $r^{th}$ round includes preset input mask data of the $r^{th}$ round, the output data includes output mask data of the $r^{th}$ round and random disturbance data of the $r^{th}$ round, and the output mask data of the $r^{th}$ round is calculated according to a preset initial value, a round key of the $r^{th}$ round, and an affine expansion mask of the $r^{th}$ round, the affine expansion mask of the $r^{th}$ round and the random disturbance data of the $r^{th}$ round are generated by a decryption function generating apparatus according to a received random seed and by using a random number generator, $1 \leq r \leq R$, R represents the number of rounds of iterative computing required for generating the decryption function.

A person skilled in the art may understand that the affine expansion mask of the $r^{th}$ round may include an input affine expansion mask of the $r^{th}$ round and an output affine expansion mask of the $r^{th}$ round, which is not specifically limited in this embodiment of the present invention.

Preferably, in this embodiment of the present invention, the affine expansion mask is determined according to $F(x)=A*x+b$, where x is an m-dimensional column vector, A and b are matrixes generated by using the random number generator and according to the random seed, A is an (n*m)-sized full-column-rank matrix on binary field, b is an n-dimensional column vector, and F(x) can be determined according to A and b.

Specifically, generation of the pre-stored decryption function required in the decryption process may be refer to the embodiment above.

1304. The decryption apparatus calculates plaintext corresponding to the ciphertext according to an output affine expansion mask included in the pre-stored affine expansion mask and the output mask data.

Specifically, for the example of using a decryption apparatus to decrypt a ciphertext, reference may be made to the example of using an encryption apparatus to encrypt a plaintext in embodiments as described above.

Figure 14:
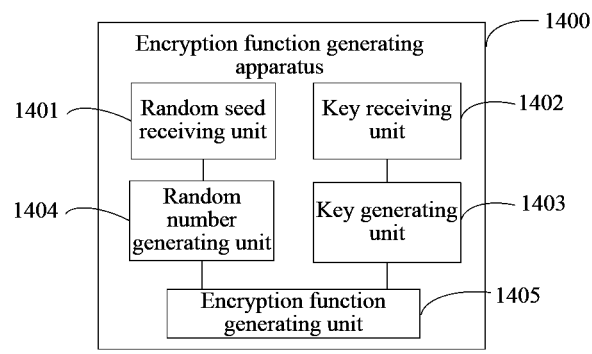
FIG. 14 is a first schematic structural diagram of an encryption function generating apparatus according to an embodiment of the present invention.

Another embodiment of the present invention provides an encryption function generating apparatus 1400. Specifically, as shown in FIG. 14, the apparatus 1400 includes a random seed receiving unit 1401, a key receiving unit 1402, a key generating unit 1403, a random number generating unit 1404, and an encryption function generating unit 1405.

The random seed receiving unit 1401 is configured to receive a random seed input by a user.

The key receiving unit 1402 is configured to receive an original key input by the user.

The key generating unit 1403 is configured to generate, according to the original key, a round key required for R-round iterative computing, where the round key required for the R-round iterative computing includes a round key of an $r^{th}$ round, R represents the number of rounds of iterative computing required for generating an encryption function, R is a positive integer, and $1 \leq r \leq R$.

The random number generating unit 1404 is configured to generate, by using a random number generator and according to the random seed, an affine expansion mask required for the R-round iterative computing and random disturbance data required for the R-round iterative computing, where the affine expansion mask is an affine transformation matrix used to map m-bit data to n-bit data, m and n are preset positive integers, n>m, the affine expansion mask required for the R-round iterative computing includes an affine expansion mask of the $r^{th}$ round, and the random disturbance data required for the R-round iterative computing includes random disturbance data of the $r^{th}$ round.

The encryption function generating unit 1405 is configured to generate an encryption function, where the encryption function includes a pre-computation table for the R-round iterative computing, a pre-computation table of the $r^{th}$ round in the pre-computation table for the R-round iterative computing includes a one-to-one mapping relationship between preset input data of the $r^{th}$ round and output data corresponding to the input data, the preset input data of the $r^{th}$ round includes preset input mask data of the $r^{th}$ round, the output data includes output mask data of the $r^{th}$ round and the random disturbance data of the $r^{th}$ round, and the output mask data of the $r^{th}$ round is calculated according to a preset initial value, the round key of the $r^{th}$ round, and the affine expansion mask of the $r^{th}$ round.

Preferably, the affine expansion mask is determined according to $F(x)=A*x+b$, where x is an m-dimensional column vector, A and b are matrixes generated by using the random number generator and according to the random seed, A is an (n*m)-sized full-column-rank matrix on binary field, b is an n-dimensional column vector, and F(x) can be determined according to A and b.

Specifically, the affine expansion mask of the $r^{th}$ round may include an input affine expansion mask of the $r^{th}$ round and an output affine expansion mask of the $r^{th}$ round.

Specially, m is preset to an input/output length of an S-box whose input length is the same as its output length.

That the output mask data of the $r^{th}$ round is calculated according to a preset initial value, the round key of the $r^{th}$ round, and the affine expansion mask of the $r^{th}$ round includes:

the output mask data of the $r^{th}$ round is calculated with reference to the S-box according to the preset initial value, the round key of the $r^{th}$ round, and the affine expansion mask of the $r^{th}$ round.

Specifically, for the method for generating an encryption function by using an encryption function generating apparatus 1400, reference may be made to the embodiments as described above, and details are not described again in this embodiment of the present invention.

Because the encryption function generating apparatus provided in this embodiment can be used to implement the foregoing method, the technical effects arising therefrom may be learned by referring to the description in the foregoing method embodiment, and details are not described herein again.

Figure 15:
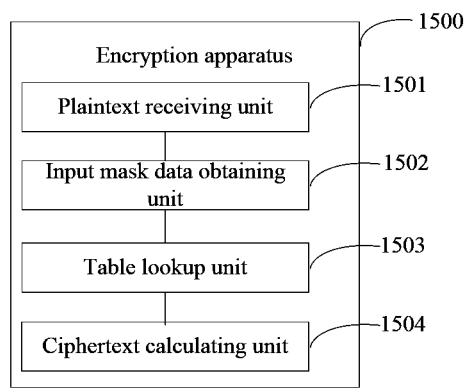
FIG. 15 is a first schematic structural diagram of an encryption apparatus according to an embodiment of the present invention.

Another embodiment of the present invention provides an encryption apparatus 1500. Specifically, as shown in FIG. 15, the encryption apparatus 1500 includes a plaintext receiving unit 1501, an input mask data calculating unit 1502, a searching unit 1503, and an ciphertext calculating unit 1504.

The plaintext receiving unit 1501 is configured to receive a plaintext input by a user.

The input mask data calculating unit 1502 is configured to calculate input mask data according to an input affine expansion mask included in a pre-stored affine expansion mask and the plaintext, where the affine expansion mask is an affine transformation matrix used to map m-bit data to n-bit data, where m and n are preset positive integers, and n>m.

The searching unit 1503 is configured to obtain output mask data according to the input mask data using pre-computation table of a pre-stored encryption function, where the pre-stored encryption function includes a pre-computation table of R-round iterative computing, a pre-computation table of an $r^{th}$ round in the pre-computation table for the R-round iterative computing includes a one-to-one mapping relationship between preset input data of the $r^{th}$ round and output data corresponding to the input data, the preset input data of the $r^{th}$ round includes preset input mask data of the $r^{th}$ round, the output data includes output mask data of the $r^{th}$ round and random disturbance data of the $r^{th}$ round, and the output mask data of the $r^{th}$ round is calculated according to a preset initial value, a round key of the $r^{th}$ round, and an affine expansion mask of the $r^{th}$ round, the affine expansion mask of the $r^{th}$ round and the random disturbance data of the $r^{th}$ round are generated by an encryption function generating apparatus 1500 according to a received random seed and by using a random number generator, 1≤r≤R, and R represents the number of rounds of iterative computing required for generating the encryption function.

The ciphertext calculating unit 1504 is configured to calculate ciphertext corresponding to the plaintext according to an output affine expansion mask included in the pre-stored affine expansion mask and the output mask data.

Preferably, the affine expansion mask is determined according to $F(x)=A*x+b$, where x is an m-dimensional column vector, A and b are matrixes generated by using the random number generator and according to the random seed, A is an (n*m)-sized full-column-rank matrix on binary field, b is an n-dimensional column vector, and F(x) can be determined according to A and b.

Specially, m is preset to an input/output length of an S-box whose input length is the same as its output length.

That the output mask data of the $r^{th}$ round is calculated according to a preset initial value, a round key of the $r^{th}$ round, and an affine expansion mask of the $r^{th}$ round includes:

the output mask data of the $r^{th}$ round is calculated with reference to the S-box according to the preset initial value, the round key of the $r^{th}$ round, and the affine expansion mask of the $r^{th}$ round.

Specifically, for the method for encrypting a plaintext by using an encryption apparatus 1500, reference may be made to the embodiments as described above.

Because the encryption apparatus provided in this embodiment can be used to implement the foregoing method, the technical effects arising therefrom may be learned by referring to the description in the foregoing method embodiment, and details are not described herein again.

Figure 16:
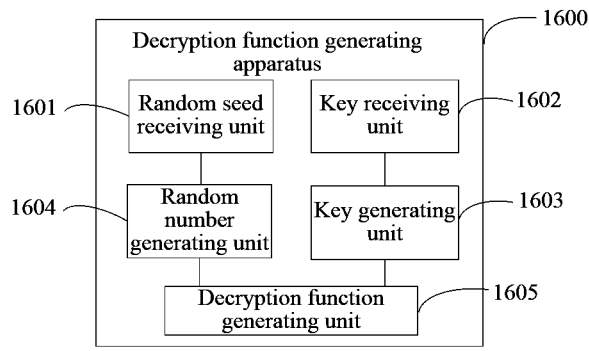
FIG. 16 is a first schematic structural diagram of a decryption function generating apparatus according to an embodiment of the present invention.

Another embodiment of the present invention provides a decryption function generating apparatus 1600. Specifically, as shown in FIG. 16, the apparatus 1600 includes a random seed receiving unit 1601, a key receiving unit 1602, a key generating unit 1603, a random number generating unit 1604, and a decryption function generating unit 1605.

The random seed receiving unit 1601 is configured to receive a random seed input by a user.

The key receiving unit 1602 is configured to receive an original key input by the user.

The key generating unit 1603 is configured to generate, according to the original key, a round key required for R-round iterative computing, where the round key required for the R-round iterative computing includes a round key of an $r^{th}$ round, R represents the number of rounds of iterative computing required for generating a decryption function, R is a positive integer, and 1≤r≤R.

The random number generating unit 1604 is configured to generate, by using a random number generator and according to the random seed, an affine expansion mask required for the R-round iterative computing and random disturbance data required for the R-round iterative computing, where the affine expansion mask is an affine transformation matrix used to map m-bit data to n-bit data, m and n are preset positive integers, n>m, the affine expansion mask required for the R-round iterative computing includes an affine expansion mask of the $r^{th}$ round, and the random disturbance data required for the R-round iterative computing includes random disturbance data of the $r^{th}$ round.

The decryption function generating unit 1605 is configured to generate a decryption function, where the decryption function includes a pre-computation table for the R-round iterative computing, a pre-computation table of the $r^{th}$ round in the pre-computation table for the R-round iterative computing includes a one-to-one mapping relationship between preset input data of the $r^{th}$ round and output data corresponding to the input data, the preset input data of the $r^{th}$ round includes preset input mask data of the $r^{th}$ round, the output data includes output mask data of the $r^{th}$ round and the random disturbance data of the $r^{th}$ round, and the output mask data of the $r^{th}$ round is calculated according to a preset initial value, the round key of the $r^{th}$ round, and the affine expansion mask of the $r^{th}$ round.

Preferably, the affine expansion mask is determined according to $F(x)=A*x+b$, where x is an m-dimensional column vector, A and b are matrixes generated by using the random number generator and according to the random seed, A is an (n*m)-sized full-column-rank matrix on binary field, b is an n-dimensional column vector, and F(x) can be determined according to A and b.

Specifically, the affine expansion mask of the $r^{th}$ round may include an input affine expansion mask of the $r^{th}$ round and an output affine expansion mask of the $r^{th}$ round.

Specially, m is preset to an input/output length of an S-box whose input length is the same as its output length.

That the output mask data of the $r^{th}$ round is calculated according to a preset initial value, the round key of the $r^{th}$ round, and the affine expansion mask of the $r^{th}$ round includes:

the output mask data of the $r^{th}$ round is calculated with reference to the S-box according to the preset initial value, the round key of the $r^{th}$ round, and the affine expansion mask of the $r^{th}$ round.

Specifically, for the method for generating a decryption function by using a decryption function generating apparatus 1600, reference may be made to the embodiments as described above.

Because the decryption function generating apparatus provided in this embodiment can be used to implement the foregoing method, the technical effects arising therefrom may be learned by referring to the description in the foregoing method embodiment, and details are not described herein again.

Figure 17:
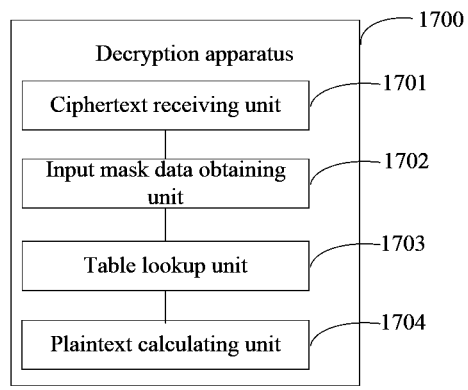
FIG. 17 is a first schematic diagram of a decryption apparatus according to an embodiment of the present invention.

Another embodiment of the present invention provides a decryption apparatus 1700. Specifically, as shown in FIG. 17, the decryption apparatus 1700 includes a ciphertext receiving unit 1701, an input mask data calculating unit 1702, a searching unit 1703, and a plaintext calculating unit 1704.

The ciphertext receiving unit 1701 is configured to receive a ciphertext input by a user.

The input mask data calculating unit 1702 is configured to calculate input mask data according to an input affine expansion mask included in a pre-stored affine expansion mask and the ciphertext, where the affine expansion mask is an affine transformation matrix used to map m-bit data to n-bit data, where m and n are preset positive integers, and n>m.

The searching unit 1703 is configured to obtain output mask data according to the input mask data using pre-computation table of a pre-stored decryption function, where the pre-stored decryption function includes a pre-computation table of R-round iterative computing, a pre-computation table of an $r^{th}$ round in the pre-computation table for the R-round iterative computing includes a one-to-one mapping relationship between preset input data of the $r^{th}$ round and output data corresponding to the input data, the preset input data of the $r^{th}$ round includes preset input mask data of the $r^{th}$ round, the output data includes output mask data of the $r^{th}$ round and random disturbance data of the $r^{th}$ round, and the output mask data of the $r^{th}$ round is calculated according to a preset initial value, a round key of the $r^{th}$ round, and an affine expansion mask of the $r^{th}$ round, the affine expansion mask of the $r^{th}$ round and the random disturbance data of the $r^{th}$ round are generated by a decryption function generating apparatus 1700 according to a received random seed and by using a random number generator, 1≤r≤R, and R represents the number of rounds of iterative computing required for generating the decryption function.

The plaintext calculating unit 1704 is configured to calculate plaintext corresponding to the ciphertext according to an output affine expansion mask included in the pre-stored affine expansion mask and the output mask data.

Preferably, the affine expansion mask is determined according to F(x)=A*x+b, where x is an m-dimensional column vector, A and b are matrixes generated by using the random number generator and according to the random seed, A is an (n*m)-sized full-column-rank matrix on binary field, b is an n-dimensional column vector, and F(x) can be determined according to A and b.

Specially, m is preset to an input/output length of an S-box whose input length is the same as its output length.

That the output mask data of the $r^{th}$ round is calculated according to a preset initial value, a round key of the $r^{th}$ round, and an affine expansion mask of the $r^{th}$ round includes:

the output mask data of the $r^{th}$ round is calculated with reference to the S-box according to the preset initial value, the round key of the $r^{th}$ round, and the affine expansion mask of the $r^{th}$ round.

Specifically, for the method for decrypting a ciphertext by using a decryption apparatus 1700, reference may be made to the description in embodiment as described above.

Because the decryption apparatus provided in this embodiment can be used to implement the foregoing method, the technical effects arising therefrom may be learned by referring to the description in the foregoing method embodiment, and details are not described herein again.

Figure 18:
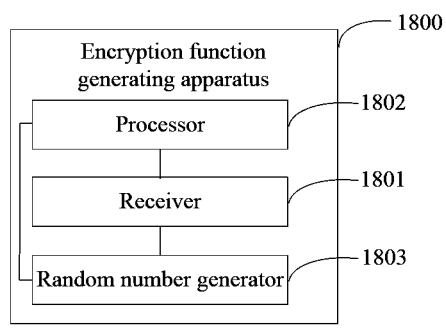
FIG. 18 is a second schematic structural diagram of an encryption function generating apparatus according to an embodiment of the present invention.

Another embodiment of the present invention provides an encryption function generating apparatus 1800. Specifically, as shown in FIG. 18, the apparatus 1800 includes: a receiver 1801, a processor 1802, and a random number generator 1803.

The receiver 1801 is configured to receive a random seed input by a user.

The receiver 1801 is further configured to receive an original key input by the user.

The processor 1802 is configured to generate, according to the original key, a round key required for R-round iterative computing, where the round key required for the R-round iterative computing includes a round key of an $r^{th}$ round, R represents the number of rounds of iterative computing required for generating an encryption function, R is a positive integer, and 1≤r≤R.

The random number generator 1803 is configured to generate, according to the random seed, an affine expansion mask required for the R-round iterative computing and random disturbance data required for the R-round iterative computing, where the affine expansion mask is an affine transformation matrix used to map m-bit data to n-bit data, m and n are preset positive integers, n>m, the affine expansion mask required for the R-round iterative computing includes an affine expansion mask of the $r^{th}$ round, and the random disturbance data required for the R-round iterative computing includes random disturbance data of the $r^{th}$ round.

The processor 1802 is configured to generate an encryption function, where the encryption function includes a pre-computation table for the R-round iterative computing, a pre-computation table of the $r^{th}$ round in the pre-computation table for the R-round iterative computing includes a one-to-one mapping relationship between preset input data of the $r^{th}$ round and output data corresponding to the input data, the preset input data of the $r^{th}$ round includes preset input mask data of the $r^{th}$ round, the output data includes output mask data of the $r^{th}$ round and the random disturbance data of the $r^{th}$ round, and the output mask data of the $r^{th}$ round is calculated according to a preset initial value, the round key of the $r^{th}$ round, and the affine expansion mask of the $r^{th}$ round.

Preferably, the affine expansion mask is determined according to F(x)=A*x+b, where x is an m-dimensional column vector, A and b are matrixes generated by using the random number generator and according to the random seed, A is an (n*m)-sized full-column-rank matrix on binary field, b is an n-dimensional column vector, and F(x) can be determined according to A and b.

Specifically, the affine expansion mask of the $r^{th}$ round may include an input affine expansion mask of the $r^{th}$ round and an output affine expansion mask of the $r^{th}$ round.

Specially, m is preset to an input/output length of an S-box whose input length is the same as its output length.

That the output mask data of the $r^{th}$ round is calculated according to a preset initial value, the round key of the $r^{th}$ round, and the affine expansion mask of the $r^{th}$ round includes:

the output mask data of the $r^{th}$ round is calculated with reference to the S-box according to the preset initial value, the round key of the $r^{th}$ round, and the affine expansion mask of the $r^{th}$ round.

Specifically, for the method for generating an encryption function by using an encryption function generating apparatus 1800, reference may be made to the embodiments as described above, and details are not described again in this embodiment of the present invention.

Because the encryption function generating apparatus provided in this embodiment can be used to implement the foregoing method, the technical effects arising therefrom may be learned by referring to the description in the foregoing method embodiment, and details are not described herein again.

Figure 19:
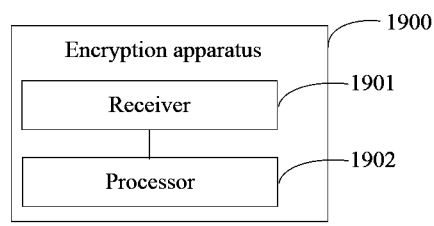
FIG. 19 is a second schematic structural diagram of an encryption apparatus according to an embodiment of the present invention.

Another embodiment of the present invention provides an encryption apparatus 1900. Specifically, as shown in FIG. 19, the encryption apparatus 1900 includes a receiver 1901 and a processor 1902.

The receiver 1901 is configured to receive a plaintext input by a user.

The processor 1902 is configured to calculate input mask data according to an input affine expansion mask included in a pre-stored affine expansion mask and the plaintext, where the affine expansion mask is an affine transformation matrix used to map m-bit data to n-bit data, where m and n are preset positive integers, and n>m.

The processor 1902 is further configured to obtains output mask data according to the input mask data using pre-computation table of a pre-stored encryption function, where the pre-stored encryption function includes a pre-computation table of R-round iterative computing, a pre-computation table of an $r^{th}$ round in the pre-computation table for the R-round iterative computing includes a one-to-one mapping relationship between preset input data of the $r^{th}$ round and output data corresponding to the input data, the preset input data of the $r^{th}$ round includes preset input mask data of the $r^{th}$ round, the output data includes output mask data of the $r^{th}$ round and random disturbance data of the $r^{th}$ round, and the output mask data of the $r^{th}$ round is calculated according to a preset initial value, a round key of the $r^{th}$ round, and an affine expansion mask of the $r^{th}$ round, the affine expansion mask of the $r^{th}$ round and the random disturbance data of the $r^{th}$ round are generated by an encryption function generating apparatus according to a received random seed and by using a random number generator, 1≤r≤R, and R represents the number of rounds of iterative computing required for generating the encryption function.

The processor 1902 is further configured to calculate ciphertext corresponding to the plaintext according to an output affine expansion mask included in the pre-stored affine expansion mask and the output mask data.

Preferably, the affine expansion mask is determined according to F(x)=A*x+b, where x is an m-dimensional column vector, A and b are matrixes generated by using the random number generator and according to the random seed, A is an (n*m)-sized full-column-rank matrix on binary field, b is an n-dimensional column vector, and F(x) can be determined according to A and b.

Preferably, m is preset to an input/output length of an S-box whose input length is the same as its output length.

That the output mask data of the $r^{th}$ round is calculated according to a preset initial value, a round key of the $r^{th}$ round, and an affine expansion mask of the $r^{th}$ round includes:

the output mask data of the $r^{th}$ round is calculated with reference to the S-box according to the preset initial value, the round key of the $r^{th}$ round, and the affine expansion mask of the $r^{th}$ round.

Specifically, for the method for encrypting a plaintext by using an encryption apparatus 1900, reference may be made to the embodiments as described above.

Because the encryption apparatus provided in this embodiment can be used to implement the foregoing method, the technical effects arising therefrom may be learned by referring to the description in the foregoing method embodiment, and details are not described herein again.

Figure 20:
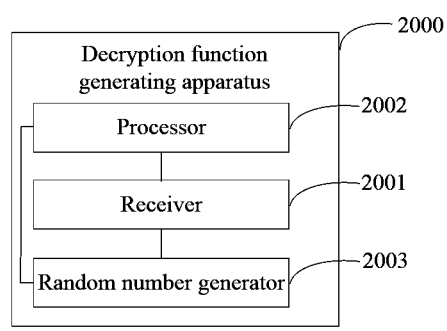
FIG. 20 is a second schematic structural diagram of a decryption function generating apparatus according to an embodiment of the present invention.

Another embodiment of the present invention provides a decryption function generating apparatus. Specifically, as shown in FIG. 20, the apparatus 2000 includes: a receiver 2001, a processor 2002, and a random number generator 2003.

The receiver 2001 is configured to receive a random seed input by a user.

The receiver 2001 is further configured to receive an original key input by the user.

The processor 2002 is configured to generate, according to the original key, a round key required for R-round iterative computing, where the round key required for the R-round iterative computing includes a round key of an $r^{th}$ round, R represents the number of rounds of iterative computing required for generating a decryption function, R is a positive integer, and 1≤r≤R.

The random number generator 2003 is configured to generate, according to the random seed, an affine expansion mask required for the R-round iterative computing and random disturbance data required for the R-round iterative computing, where the affine expansion mask is an affine transformation matrix used to map m-bit data to n-bit data, m and n are preset positive integers, n>m, the affine expansion mask required for the R-round iterative computing includes an affine expansion mask of the $r^{th}$ round, and the random disturbance data required for the R-round iterative computing includes random disturbance data of the $r^{th}$ round.

The processor 2002 is configured to generate a decryption function, where the decryption function includes a pre-computation table for the R-round iterative computing, a pre-computation table of the $r^{th}$ round in the pre-computation table for the R-round iterative computing includes a one-to-one mapping relationship between preset input data of the $r^{th}$ round and output data corresponding to the input data, the preset input data of the $r^{th}$ round includes preset input mask data of the $r^{th}$ round, the output data includes output mask data of the $r^{th}$ round and the random disturbance data of the $r^{th}$ round, and the output mask data of the $r^{th}$ round is calculated according to a preset initial value, the round key of the $r^{th}$ round, and the affine expansion mask of the $r^{th}$ round.

Preferably, the affine expansion mask is determined according to F(x)=A*x+b, where x is an m-dimensional column vector, A and b are matrixes generated by using the random number generator and according to the random seed, A is an (n*m)-sized full-column-rank matrix on binary field, b is an n-dimensional column vector, and F(x) can be determined according to A and b.

Specifically, the affine expansion mask of the $r^{th}$ round may include an input affine expansion mask of the $r^{th}$ round and an output affine expansion mask of the $r^{th}$ round.

Specially, m is preset to an input/output length of an S-box whose input length is the same as its output length.

That the output mask data of the $r^{th}$ round is calculated according to a preset initial value, the round key of the $r^{th}$ round, and the affine expansion mask of the $r^{th}$ round includes:

the output mask data of the $r^{th}$ round is calculated with reference to the S-box according to the preset initial value, the round key of the $r^{th}$ round, and the affine expansion mask of the $r^{th}$ round.

Specifically, for the method for generating a decryption function by using a decryption function generating apparatus 2000, reference may be made to the embodiment as described above.

Because the decryption function generating apparatus provided in this embodiment can be used to implement the foregoing method, the technical effects arising therefrom may be learned by referring to the description in the foregoing method embodiment, and details are not described herein again.

Figure 21:
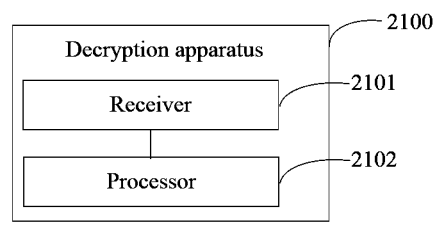
FIG. 21 is a second schematic diagram of a decryption apparatus according to an embodiment of the present invention.

Another embodiment of the present invention provides a decryption apparatus 2100. Specifically, as shown in FIG. 21, the decryption apparatus 2100 includes a receiver 2101 and a processor 2102.

The receiver 2101 is configured to receive a ciphertext input by a user.

The processor 2102 is configured to calculate input mask data according to an input affine expansion mask included in a pre-stored affine expansion mask and the ciphertext, where the affine expansion mask is an affine transformation matrix used to map m-bit data to n-bit data, where m and n are preset positive integers, and n>m.

The processor 2102 is further configured to obtains output mask data according to the input mask data using pre-computation table of a pre-stored decryption function, where the pre-stored decryption function includes a pre-computation table of R-round iterative computing, a pre-computation table of an $r^{th}$ round in the pre-computation table for the R-round iterative computing includes a one-to-one mapping relationship between preset input data of the $r^{th}$ round and output data corresponding to the input data, the preset input data of the $r^{th}$ round includes preset input mask data of the $r^{th}$ round, the output data includes output mask data of the $r^{th}$ round and random disturbance data of the $r^{th}$ round, and the output mask data of the $r^{th}$ round is calculated according to a preset initial value, a round key of the $r^{th}$ round, and an affine expansion mask of the $r^{th}$ round, the affine expansion mask of the $r^{th}$ round and the random disturbance data of the $r^{th}$ round are generated by a decryption function generating apparatus according to a received random seed and by using a random number generator, 1≤r≤R, and R represents the number of rounds of iterative computing required for generating the decryption function.

The processor 2102 is further configured to calculate plaintext corresponding to the ciphertext according to an output affine expansion mask included in the pre-stored affine expansion mask and the output mask data.

Preferably, the affine expansion mask is determined according to F(x)=A*x+b, where x is an m-dimensional column vector, A and b are matrixes generated by using the random number generator and according to the random seed, A is an (n*m)-sized full-column-rank matrix on binary field, b is an n-dimensional column vector, and F(x) can be determined according to A and b.

Preferably, m is preset to an input/output length of an S-box whose input length is the same as its output length.

That the output mask data of the $r^{th}$ round is calculated according to a preset initial value, a round key of the $r^{th}$ round, and an affine expansion mask of the $r^{th}$ round includes:

the output mask data of the $r^{th}$ round is calculated with reference to the S-box according to the preset initial value, the round key of the $r^{th}$ round, and the affine expansion mask of the $r^{th}$ round.

Specifically, for the method for decrypting a ciphertext by using a decryption apparatus 2100, reference may be made to the description in embodiments as described above, and details are not described again in this embodiment of the present invention.

Because the decryption apparatus provided in this embodiment can be used to implement the foregoing method, the technical effects arising therefrom may be learned by referring to the description in the foregoing method embodiment, and details are not described herein again.

It may be clearly understood by a person skilled in the art that, for ease and brevity of description, in the foregoing apparatus, the division of the foregoing function modules is used as an example for illustration. In an actual application, the foregoing functions can be allocated to different modules and implemented according to a requirement, that is, an inner structure of an apparatus is divided into different function modules to implement all or a part of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the purposes of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An encryption function generating method, wherein the method comprises:
   receiving a random seed and an original key that are input by a user;
   generating, according to the original key, a round key required for R-round iterative computing, wherein the round key required for R-round iterative computing comprises a round key of an $r^{th}$ round, R represents a number of rounds of iterative computing required for generating an encryption function, R is a positive integer, and $1 \leq r \leq R$;
   generating, using a random number generator and according to the random seed, an affine expansion mask required for the R-round iterative computing and random disturbance data required for the R-round iterative computing, wherein the affine expansion mask is used to affinely transform m-bit data into n-bit data, m and n are preset positive integers, n>m, the affine expansion mask required for the R-round iterative computing comprises an affine expansion mask of the $r^{th}$ round, and the random disturbance data required for the R-round iterative computing comprises random disturbance data of the $r^{th}$ round; and
   generating the encryption function, wherein the encryption function comprises a pre-computation table for the R-round iterative computing, a pre-computation table of the $r^{th}$ round in the pre-computation table for the R-round iterative computing comprises a one-to-one mapping relationship between preset input data of the $r^{th}$ round and output data corresponding to the input data, the preset input data of the $r^{th}$ round comprises preset input mask data of the $r^{th}$ round, the output data comprises output mask data of the $r^{th}$ round and the random disturbance data of the $r^{th}$ round, and the output mask data of the $r^{th}$ round is calculated according to a preset initial value, the round key of the $r^{th}$ round, and the affine expansion mask of the $r^{th}$ round.

2. The method according to claim 1, wherein the affine expansion mask is determined according to F(x)=A*x+b, wherein x is an m-dimensional column vector, A and b are matrixes generated using the random number generator and according to the random seed, A is an (n*m)-sized full-column-rank matrix on a binary field, b is an n-dimensional column vector, and F(x) is determined according to A and b.

3. The method according to claim 1, wherein the affine expansion mask of the $r^{th}$ round comprises an input affine expansion mask of the $r^{th}$ round and an output affine expansion mask of the $r^{th}$ round.

4. The method according to claim 1, wherein m is preset to an input/output length of an S-box wherein the input length of the S-box is the same as the output length of the S-box;
   the output mask data of the $r^{th}$ round is calculated with reference to the S-box according to the preset initial value, the round key of the $r^{th}$ round, and the affine expansion mask of the $r^{th}$ round.

5. An encryption method, wherein the method comprises:
   receiving a plaintext input by a user;
   calculating input mask data according to an input affine expansion mask comprised in a pre-stored affine expansion mask and the plaintext, wherein the affine expansion mask is used to affinely transform m-bit data into n-bit data, wherein m and n are preset positive integers, and n>m;
   obtaining output mask data according to the input mask data using a pre-stored encryption function, wherein the pre-stored encryption function comprises a pre-computation table of R-round iterative computing, a pre-computation table of an $r^{th}$ round in the pre-computation table for the R-round iterative computing comprises a one-to-one mapping relationship between preset input data of the $r^{th}$ round and output data corresponding to the input data, the preset input data of the $r^{th}$ round comprises preset input mask data of the $r^{th}$ round, the output data comprises output mask data of the $r^{th}$ round and random disturbance data of the $r^{th}$ round, and the output mask data of the $r^{th}$ round is calculated according to a preset initial value, a round key of the $r^{th}$ round, and an affine expansion mask of the $r^{th}$ round, the affine expansion mask of the $r^{th}$ round and the random disturbance data of the $r^{th}$ round are generated by an encryption function generating apparatus according to a received random seed and by using a random number generator, $1 \leq r \leq R$, R represents the number of rounds of iterative computing required for generating the encryption function; and
   calculating ciphertext corresponding to the plaintext according to an output affine expansion mask comprised in the pre-stored affine expansion mask and the output mask data.

6. The method according to claim 5, wherein the affine expansion mask is determined according to F(x)=A*x+b, wherein x is an m-dimensional column vector, A and b are matrixes generated using the random number generator and according to the random seed, A is an (n*m)-sized full-column-rank matrix on a binary field, b is an n-dimensional column vector, and F(x) is determined according to A and b.

7. The method according to claim 5, wherein m is preset to an input/output length of an S-box, wherein the input length of the S-box is the same as the output length of the S-box; and the output mask data of the $r^{th}$ round is calculated with reference to the S-box according to the preset initial value, the round key of the $r^{th}$ round, and the affine expansion mask of the $r^{th}$ round.

8. A decryption method, wherein the method comprises:

receiving a ciphertext input by a user;

calculating input mask data according to an input affine expansion mask comprised in a pre-stored affine expansion mask and the ciphertext, wherein the affine expansion mask is used to affinely transform m-bit data into n-bit data, wherein m and n are preset positive integers, and n>m;

obtaining output mask data according to the input mask data using a pre-stored decryption function, wherein the pre-stored decryption function comprises a pre-computation table for R-round iterative computing, a pre-computation table of an $r^{th}$ round in the pre-computation table for the R-round iterative computing comprises a one-to-one mapping relationship between preset input data of the $r^{th}$ round and output data corresponding to the input data, the preset input data of the $r^{th}$ round comprises preset input mask data of the $r^{th}$ round, the output data comprises output mask data of the $r^{th}$ round and random disturbance data of the $r^{th}$ round, and the output mask data of the $r^{th}$ round is calculated according to a preset initial value, a round key of the $r^{th}$ round, and an affine expansion mask of the $r^{th}$ round, the affine expansion mask of the $r^{th}$ round and the random disturbance data of the $r^{th}$ round are generated by a decryption function generating apparatus according to a received random seed and by using a random number generator, $1 \leq r \leq R$, and R represents the number of rounds of iterative computing required for generating the decryption function; and calculating plaintext corresponding to the ciphertext according to an output affine expansion mask comprised in the pre-stored affine expansion mask and the output mask data.

9. The method according to claim 8, wherein the affine expansion mask is determined according to $F(x)=A*x+b$, wherein x is an m-dimensional column vector, A and b are matrixes generated using the random number generator and according to the random seed, A is an (n*m)-sized full-column-rank matrix on a binary field, b is an n-dimensional column vector, and F(x) is determined according to A and b.

10. The method according to claim 8, wherein m is preset to an input/output length of an S-box, wherein the input length of the S-box is the same as the output length of the S-box;

the output mask data of the $r^{th}$ round is calculated with reference to the S-box according to the preset initial value, the round key of the $r^{th}$ round, and the affine expansion mask of the $r^{th}$ round.

11. An encryption apparatus, wherein the encryption apparatus comprises a receiver, and a processor;

the receiver is configured to receive a plaintext input by a user;

the processor is configured to:

calculate input mask data according to an input affine expansion mask comprised in a pre-stored affine expansion mask and the plaintext, wherein the affine expansion mask is used to affinely transform m-bit data into n-bit data, wherein m and n are preset positive integers, and n>m;

obtain output mask data according to the input mask data using a pre-stored encryption function, wherein the pre-stored encryption function comprises a pre-computation table for R-round iterative computing, a pre-computation table of an $r^{th}$ round in the pre-computation table for the R-round iterative computing comprises a one-to-one mapping relationship between preset input data of the $r^{th}$ round and output data corresponding to the input data, the preset input data of the $r^{th}$ round comprises preset input mask data of the $r^{th}$ round, the output data comprises output mask data of the $r^{th}$ round and random disturbance data of the $r^{th}$ round, and the output mask data of the $r^{th}$ round is calculated according to a preset initial value, a round key of the $r^{th}$ round, and an affine expansion mask of the $r^{th}$ round, the affine expansion mask of the $r^{th}$ round and the random disturbance data of the $r^{th}$ round are generated by an encryption function generating apparatus according to a received random seed and by using a random number generator, $1 \leq r \leq R$, and R represents the number of rounds of iterative computing required for generating the encryption function; and calculate ciphertext corresponding to the plaintext according to an output affine expansion mask comprised in the pre-stored affine expansion mask and the output mask data.

12. The apparatus according to claim 11, wherein the affine expansion mask is determined according to $F(x)=A*x+b$, wherein x is an m-dimensional column vector, A and b are matrixes generated using the random number generator and according to the random seed, A is an (n*m)-sized full-column-rank matrix on a binary field, b is an n-dimensional column vector, and F(x) is determined according to A and b.

13. The apparatus according to claim 11, wherein m is preset to an input/output length of an S-box, wherein the input length of the S-box is the same as the output length of the S-box;

the output mask data of the $r^{th}$ round is calculated with reference to the S-box according to the preset initial value, the round key of the $r^{th}$ round, and the affine expansion mask of the $r^{th}$ round.

14. A decryption apparatus, wherein the decryption apparatus comprises a receiver, and a processor;

the receiver is configured to receive a ciphertext input by a user;

the processor is configured to:

calculate input mask data according to an input affine expansion mask comprised in a pre-stored affine expansion mask and the ciphertext, wherein the affine expansion mask is used to affinely transform m-bit data into n-bit data, wherein m and n are preset positive integers, and n>m;

obtain output mask data according to the input mask data using a pre-stored decryption function, wherein the pre-stored decryption function comprises a pre-computation table for R-round iterative computing, a pre-computation table of an $r^{th}$ round in the pre-computation table for the R-round iterative computing comprises a one-to-one mapping relationship between preset input data of the $r^{th}$ round and output data corresponding to the input data, the preset input data of the $r^{th}$ round comprises preset input mask data of the $r^{th}$ round, the output data comprises output mask data of the $r^{th}$ round and random disturbance data of the $r^{th}$ round, and the output mask data of the $r^{th}$ round is calculated according to a preset initial value, a round key of the $r^{th}$ round, and an affine expansion mask of the $r^{th}$ round, the affine expansion mask of the $r^{th}$ round and the random disturbance data of the $r^{th}$ round are generated by a decryption function generating apparatus according to a received random seed and by using a random number generator, $1 \leq r \leq R$, and R represents the number of rounds of iterative computing required for generating the decryption function; and calculate plaintext corresponding to the ciphertext according to an output affine expansion mask comprised in the pre-stored affine expansion mask and the output mask data.

15. The apparatus according to claim 14, wherein the affine expansion mask is determined according to $F(x)=A*x+b$, wherein x is an m-dimensional column vector, A and b are matrixes generated using the random number generator and according to the random seed, A is an (n*m)-sized full-column-rank matrix on a binary field, b is an n-dimensional column vector, and $F(x)$ is determined according to A and b.

16. The apparatus according to claim 14, wherein m is preset to an input/output length of an S-box, wherein the input length of the S-box is the same as the output length of the S-box;

the output mask data of the $r^{th}$ round is calculated with reference to the S-box according to the preset initial value, the round key of the $r^{th}$ round, and the affine expansion mask of the $r^{th}$ round.

* * * * *